United States Patent
Ki et al.

(10) Patent No.: US 12,248,689 B2
(45) Date of Patent: Mar. 11, 2025

(54) VIDEO STREAM ENCODING FOR COMPUTATIONAL STORAGE DEVICE

(71) Applicant: Samsung Electronics Co., Ltd., Suwon-si (KR)

(72) Inventors: Yang Seok Ki, Palo Alto, CA (US); Chanik Park, San Jose, CA (US); Sungwook Ryu, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/847,125

(22) Filed: Jun. 22, 2022

(65) Prior Publication Data

US 2023/0266902 A1    Aug. 24, 2023

Related U.S. Application Data

(60) Provisional application No. 63/313,252, filed on Feb. 23, 2022.

(51) Int. Cl.

| G06F 3/06 | (2006.01) |
| H04N 19/15 | (2014.01) |
| H04N 19/423 | (2014.01) |
| H04N 21/218 | (2011.01) |
| H04N 21/231 | (2011.01) |
| H04N 21/232 | (2011.01) |

(52) U.S. Cl.
CPC ............ *G06F 3/064* (2013.01); *G06F 3/0608* (2013.01); *H04N 19/15* (2014.11); *H04N 19/423* (2014.11); *H04N 21/21815* (2013.01); *H04N 21/231* (2013.01); *H04N 21/232* (2013.01)

(58) Field of Classification Search
CPC ....... G06F 3/064; G06F 3/0608; H04N 19/15; H04N 19/423; H04N 21/21815; H04N 21/231; H04N 21/232; H04N 21/8456; H04N 21/23103; H04N 21/433
See application file for complete search history.

(56) References Cited

U.S. PATENT DOCUMENTS

| 5,832,172 | A | * | 11/1998 | Jeon ..................... G11B 5/0086 386/326 |
| 6,157,771 | A | | 12/2000 | Brewer et al. |
| 6,167,088 | A | | 12/2000 | Sethuraman |
| 6,643,327 | B1 | | 11/2003 | Wang |
| 6,678,332 | B1 | | 1/2004 | Gardere et al. |
| 7,076,560 | B1 | | 7/2006 | Lango et al. |
| 7,085,322 | B2 | | 8/2006 | Ngai et al. |

(Continued)

OTHER PUBLICATIONS

European Extended Search Report for Application No. 23157581.2, mailed Mar. 28, 2023.

(Continued)

*Primary Examiner* — Michael A Keller
*Assistant Examiner* — Chhian (Amy) Ling
(74) *Attorney, Agent, or Firm* — Renaissance IP Law Group LLP

(57) ABSTRACT

A storage system is disclosed. The storage system may include a first storage device and a second storage device. A receiver may receive an encoded stream. A splitter may identify a first chunk of data in the encoded stream and a second chunk of data in the encoded stream. A distributor may store the first chunk of data on the first storage device and the second chunk of data on the second storage device.

20 Claims, 17 Drawing Sheets

(56) References Cited

U.S. PATENT DOCUMENTS

| | | |
|---|---|---|
| 7,143,433 B1 | 11/2006 | Duan et al. |
| 8,366,552 B2 | 2/2013 | Perlman et al. |
| 8,396,114 B2 | 3/2013 | Gu et al. |
| 8,712,215 B2 | 4/2014 | Ikeda et al. |
| 9,131,216 B2 | 9/2015 | Argyropoulos et al. |
| 9,338,467 B1 | 5/2016 | Gadepalli et al. |
| 9,392,246 B2 | 7/2016 | Ogawa et al. |
| 9,414,078 B2 | 8/2016 | Eckart |
| 10,375,156 B2 | 8/2019 | Coward et al. |
| 10,506,235 B2 | 12/2019 | Coward et al. |
| 10,863,179 B1* | 12/2020 | Nandakumar ....... H04N 19/436 |
| 2004/0088380 A1 | 5/2004 | Chung et al. |
| 2005/0074063 A1* | 4/2005 | Nair .................... H04N 19/156 375/E7.161 |
| 2010/0189183 A1* | 7/2010 | Gu .................. H04N 21/23439 375/E7.154 |
| 2012/0254126 A1* | 10/2012 | Mitra ................... G06F 16/128 707/687 |
| 2013/0104177 A1 | 4/2013 | Kwan et al. |
| 2015/0189222 A1 | 7/2015 | John et al. |
| 2017/0078376 A1* | 3/2017 | Coward ............... H04N 19/395 |
| 2018/0026659 A1* | 1/2018 | Kim ................... H03M 13/1108 714/764 |
| 2019/0082114 A1* | 3/2019 | Jeon ..................... H04N 23/698 |
| 2020/0213086 A1* | 7/2020 | Lee ....................... H04L 9/0825 |
| 2020/0257629 A1* | 8/2020 | Pinto .................. G06F 12/0868 |
| 2020/0288212 A1* | 9/2020 | Alvarez Dominguez ................... H04L 65/80 |
| 2020/0293192 A1 | 9/2020 | Ki et al. |
| 2022/0182690 A1* | 6/2022 | Ryder .............. H04N 21/21815 |

OTHER PUBLICATIONS

European Office Action for Application No. 23157581.2, mailed Dec. 13, 2023.

* cited by examiner

| Directory | | |
|---|---|---|
| Clip 1 _720-1_ | CSU 1 _705-1_ | Filename 1, Filename 3, Filename 5 _715-1_ |
| Clip 1 _720-1_ | CSU 2 _705-2_ | Filename 2, Filename 4, Filename 6 _715-2_ |
| Clip 2 _720-2_ | CSU 1 _705-1_ | Filename 7, Filename 9, Filename 11 _715-3_ |
| Clip 2 _720-2_ | CSU 2 _705-2_ | Filename 8, Filename 10, Filename 12 _715-4_ |
| ⋮ | | |

640

710-1 → (row 1)
710-2 → (row 2)
710-3 → (row 3)
710-4 → (row 4)

FIG. 7

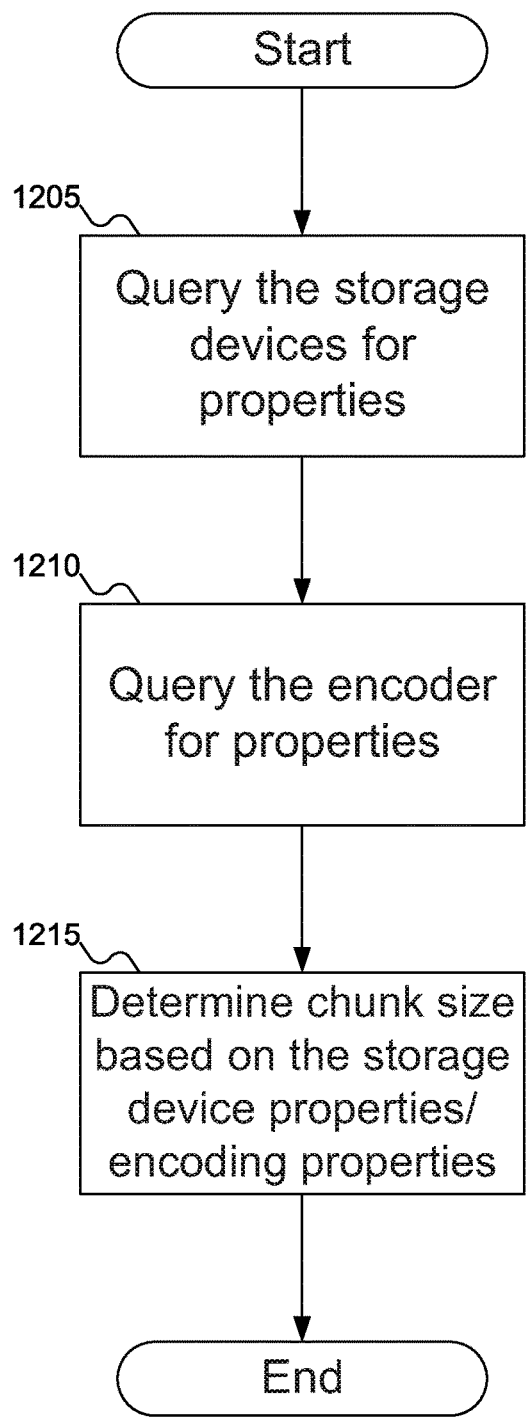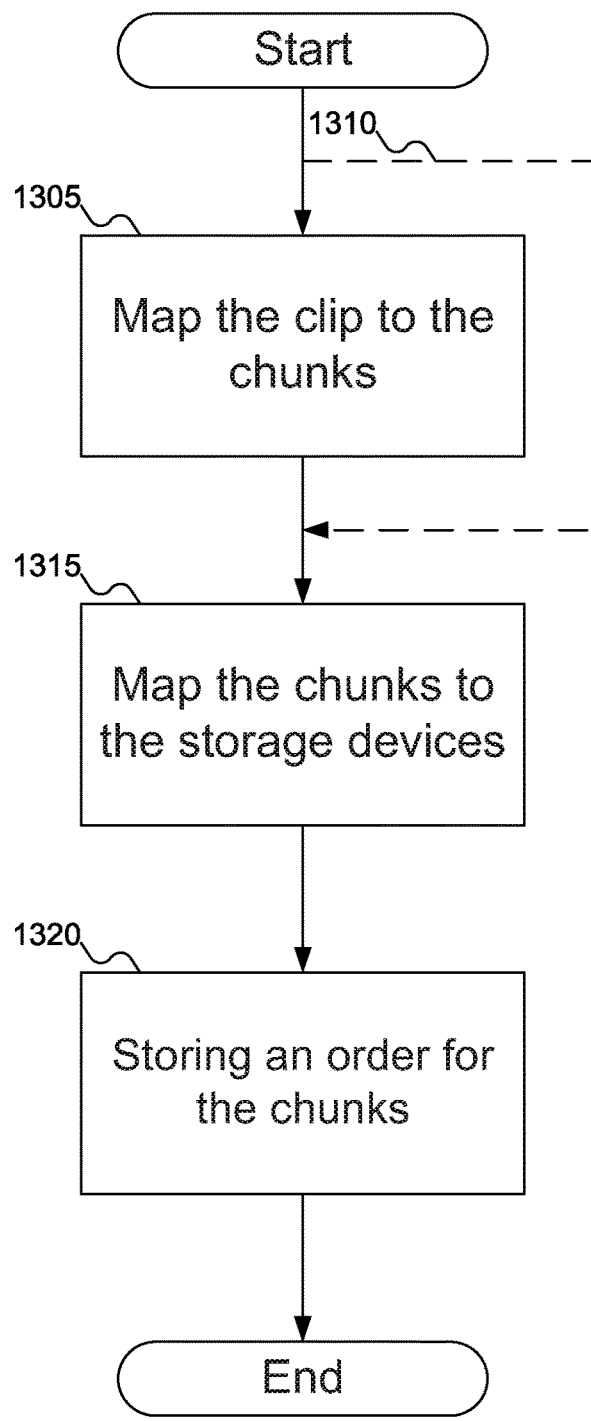
FIG. 12
FIG. 13

VIDEO STREAM ENCODING FOR COMPUTATIONAL STORAGE DEVICE

RELATED APPLICATION DATA

This application claims the benefit of U.S. Provisional Patent Application Ser. No. 63/313,252, filed Feb. 23, 2022, which is incorporated by reference herein for all purposes.

FIELD

The disclosure relates generally to storage devices, and more particularly to storage devices supporting video streaming.

BACKGROUND

Video data may be stored as files on storage devices. Each file may represent a "clip" of video data. But the management of the files may be left to the file system. If there are multiple storage devices accessible to the file system, it might not be possible to predict where any individual file is stored, or leverage the storage of the files.

A need remains for a way to improve the processing of stored video data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 7 shows details of the directory of FIG. 6, according to embodiments of the disclosure.

FIG. 12 shows a flowchart of an example procedure for the object estimator of FIG. 6 to determine the chunk size of FIG. 8, according to embodiments of the disclosure.

FIG. 13 shows a flowchart of an example procedure for storing mappings between the clips of FIG. 7 and/or the chunks of FIG. 6 and the storage devices of FIG. 1/computational storage units of FIG. 1, according to embodiments of the disclosure.

SUMMARY

Figure 1:
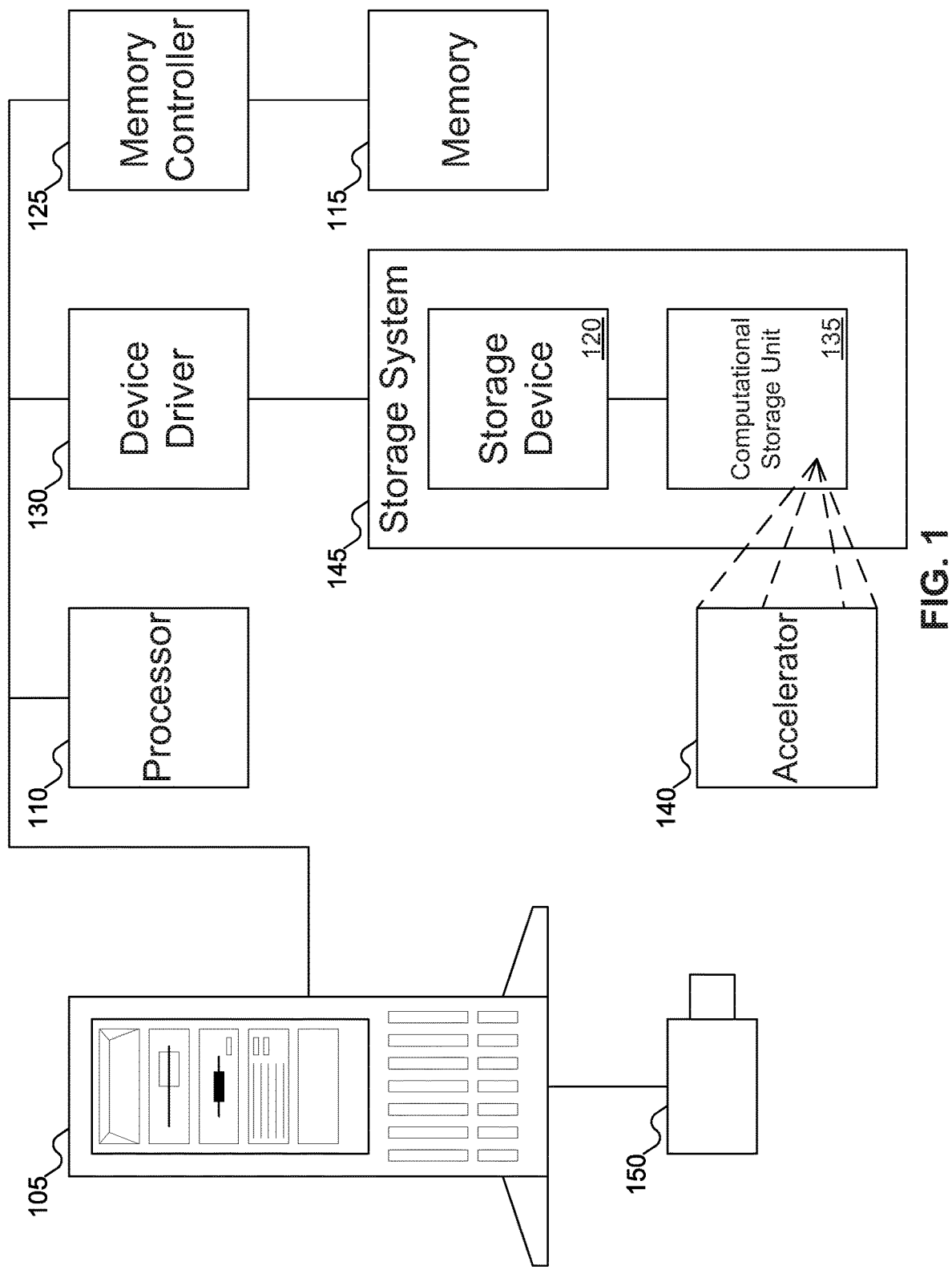
FIG. 1 shows a machine with a storage system supporting improved processing of stored video data, according to embodiments of the disclosure.

Embodiments of the disclosure include a storage system. The storage system may include two or more storage devices. A receiver may receive an encoded stream. A splitter may identify chunks in the encoded stream. A distributor may store the chunks on the storage devices.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Video data, when stored in the raw (that is, unencoded and/or uncompressed), may involve large amounts of storage. To reduce the amount of storage used by video data, the video data may be encoded. For example, rather than storing an entire frame, only the differences relative to an earlier frame might be stored.

The video data may be divided into clips, each of which may represent a portion (for example, a few seconds) of video. Each clip may be stored as a separate file on storage device(s). But management of the files may be left to the operating system. If there are multiple storage devices on which the file may be stored, the choice of which storage device is used to store a particular file may be left to the file system.

As the clips (and therefore the video data) may be encoded, to view a clip or watch the entire video data, the clip or the video data may be decoded. Since the files may have been stored on any storage device, the files may be retrieved using the file system and delivered to the host processor. The host processor may then decode the files and stream them to the user.

Because the clips are retrieved from the storage devices and delivered to the host processor, the links between the storage devices and the host processor may become a bottleneck, potentially preventing reading other data from or writing other data to the storage devices. In addition, as the host processor may be tasked with decoding the clips, the host processor may be prevented from executing other commands, which may delay the execution of other commands.

Embodiments of the disclosure address these problems by using computational storage devices. As computational storage devices may include accelerators, these accelerators may be used to decode the clips, which may reduce the load on the host processor and avoid needing to deliver data across the links between the storage devices and the host processor. In addition, clips may be stored on the computational storage devices in a manner that may attempt to optimize their retrieval and decoding. By placing individual clips (or chunks) on different computational storage devices, it may be possible to give each computational storage unit the maximum amount of time to decode individual clips (or chunks), which may reduce the need for quantization of data to maintain a desired bit rate.

FIG. 1 shows a machine with a storage system supporting improved processing of stored video data, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may each support any desired protocol or protocols, including, for example, the Non-Volatile Memory Express (NVMe) protocol. Different storage devices 120 may support different protocols and/or interfaces.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

Machine 105 may also include computational storage unit 135 (which may also be called a computational device or a computational storage, either with or without storage device 120). Computational storage unit 135 may be a form of local processing "nearer" to storage device 120 than processor 110, and which may perform processing to reduce the load on processor 110. Computational storage unit 135 is discussed further with reference to FIGS. 3A-3D below.

Computational storage unit 135 may include accelerator 140. Accelerator 140 may be any desired form of accelerator, which may perform processing "nearer" to the data. While FIG. 1 shows accelerator 140 as a part of computational storage unit 135 (as may occur when, for example, computational storage unit 135 is a storage device with built-in processing capability), in some embodiments of the disclosure computational storage unit 135 may be accelerator 135 with little more than, for example, communication links to storage device 120 for retrieval of data to be processed by accelerator 140. Accelerator 140 may be implemented as any desired of accelerator, including, for example, a single core processor or a multi-core processor, a graphics processing unit (GPU), a general purpose GPU (GPGPU), a System-on-a-Chip (SoC), a neural processing unit (NPU), a tensor processing unit (TPU), a field programmable gate array (FPGA), or an application-specific integrated circuit (ASIC), among other possibilities.

In some embodiments of the disclosure, machine 105 may include multiple storage devices. These multiple storage devices may be grouped together to form storage system 145 (which may also be termed a network video recorder, at least in the context of storing video data).

While the data stored on storage system 145 may be of any type, in some embodiments of the disclosure the data may be video data. This video data may be generated by a camera, such as camera 150. Camera 150 may be a video camera or a still camera. While FIG. 1 shows camera 150 as connected to machine 105, in some embodiments of the data, camera 150 may be connected to machine 105 via a network connection (not shown in FIG. 1). While the discussion below may focus on video data, embodiments of the disclosure may extend to any other types of data that may be divided into units that may be processed independently of each other.

Figure 2:
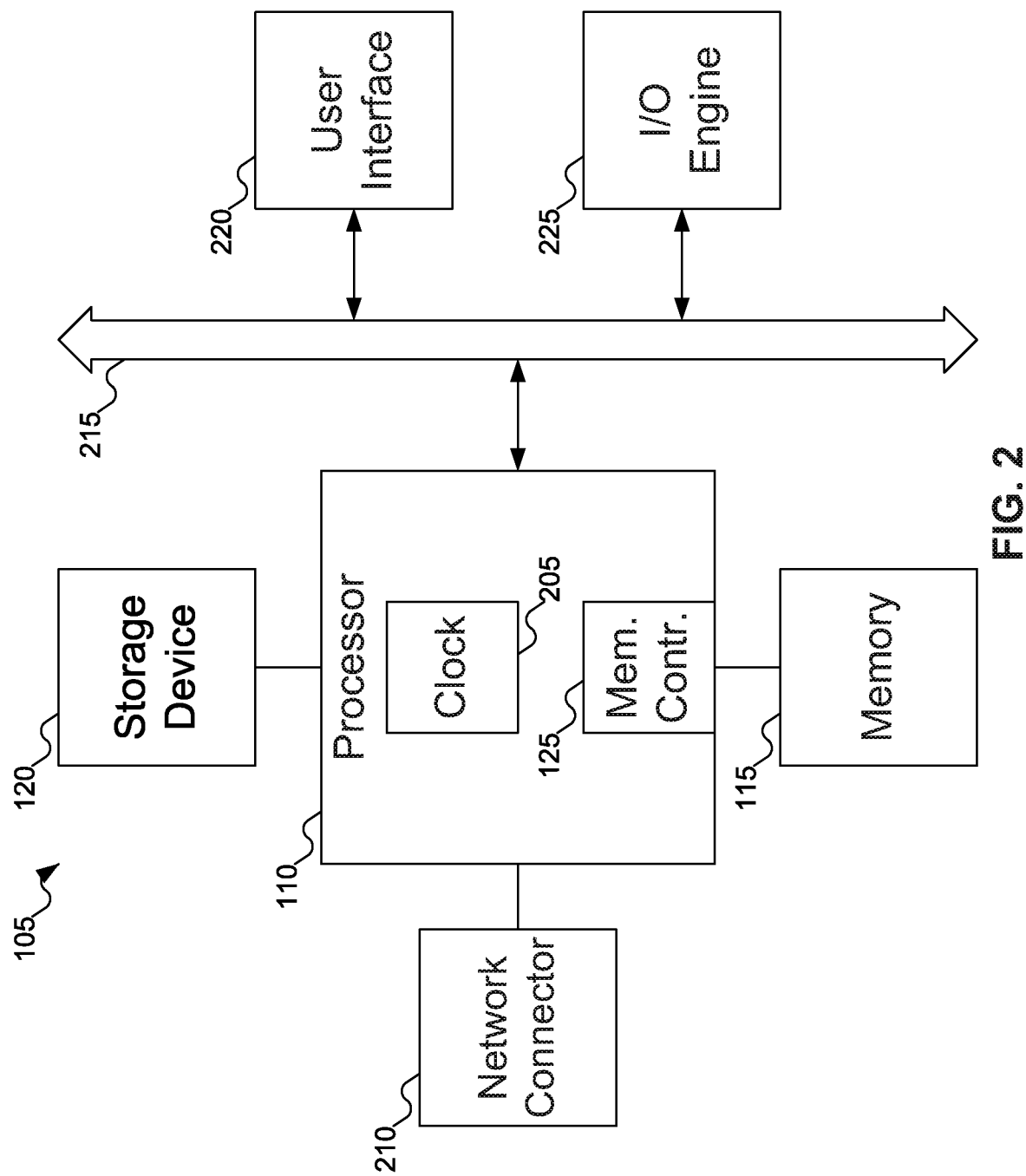
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
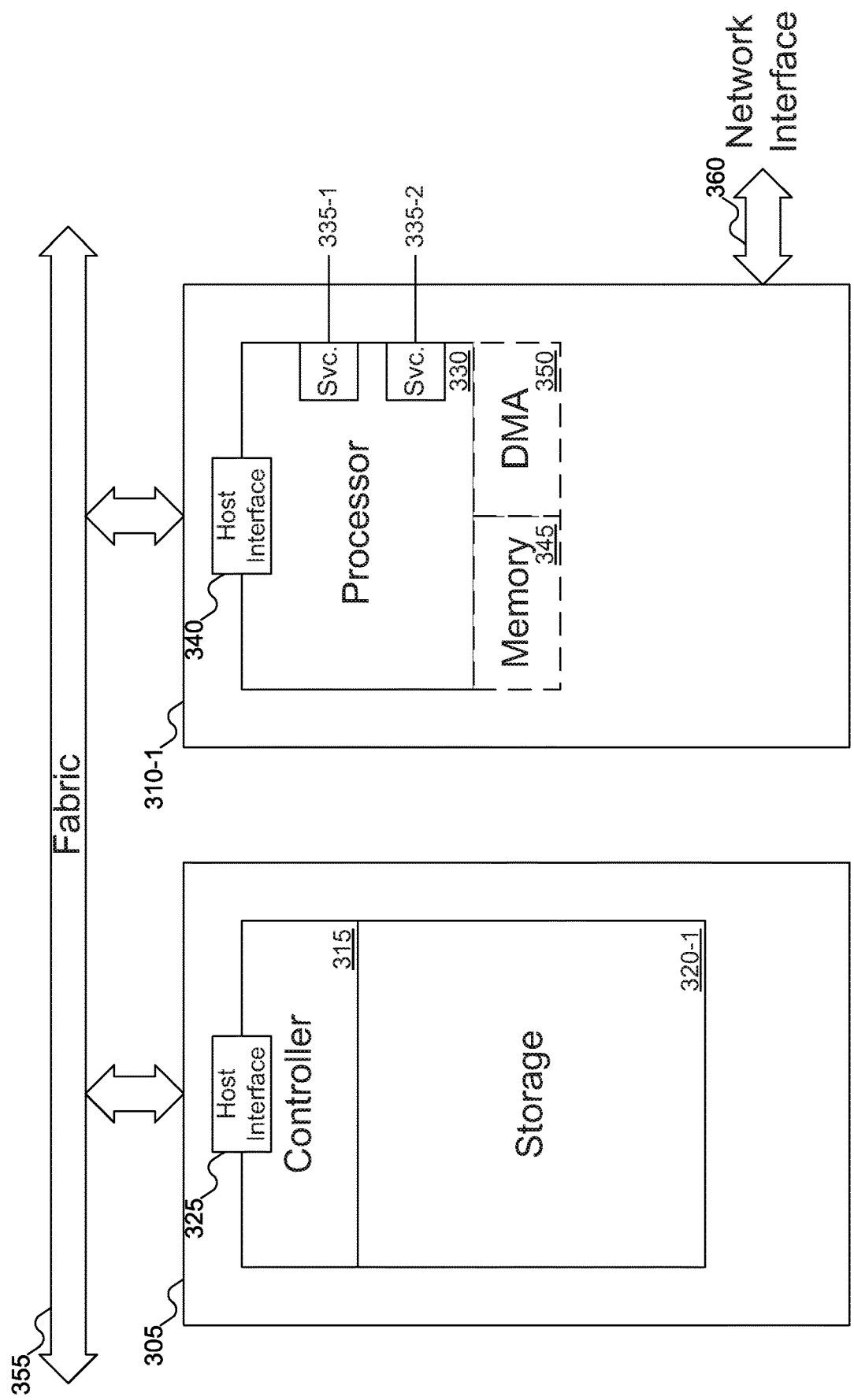
FIG. 3A shows a first example implementation of the computational storage unit of FIG. 1, according to embodiments of the disclosure.

FIGS. 3A-3D shows example implementations of computational storage unit 135 of FIG. 1, according to embodiments of the disclosure. In FIG. 3A, storage device 305 and computational device 310-1 are shown. Storage device 305 may include controller 315 and storage 320-1, and may be reachable across a host protocol interface, such as host interface 325. Host interface 325 may be used both for management of storage device 305 and to control I/O of storage device 305. An example of host interface 325 may include queue pairs for submission and completion, but other host interfaces 325 are also possible, using any native host protocol supported by storage device 305.

Computational device 310-1 may be paired with storage device 305. Computational device 310-1 may include any number (one or more) processors 330, each of which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Each processor 330 may be a single core processor or a multi-core processor, a GPU, a GPGPU, an SoC, an NPU, a TPU, an FPGA, or an ASIC, among other possibilities.

Computational device 310-1 may be reachable across a host protocol interface, such as host interface 340, which may be used for both management of computational device 310-1 and/or to control I/O of computational device 310-1. As with host interface 325, host interface 340 may include queue pairs for submission and completion, but other host interfaces 340 are also possible, using any native host protocol supported by computational device 310-1. Examples of such host protocols may include Ethernet, Remote Direct Memory Access (RDMA), Transmission Control Protocol/Internet Protocol (TCP/IP), InfiniBand, Peripheral Component Interconnect Express (PCIe), Serial Attached Small Computer System Interface (SCSI) (SAS), Internet SCSI (iSCSI), and Serial AT Attachment (SATA), among other possibilities. In addition, host interface 340 may support communications with other components of system 105 of FIG. 1—for example, a network interface card (NIC)—or to operate as a NIC and communicate with local and/or remote network/cloud components.

Processor(s) 330 may be thought of as near-storage processing: that is, processing that is closer to storage device 305 than processor 110 of FIG. 1. Because processor(s) 330 are closer to storage device 305, processor(s) 330 may be able to execute commands on data stored in storage device 305 more quickly than for processor 110 of FIG. 1 to execute such commands. Processor(s) 330 may have associated memory 345, which may be used for local execution of commands on data stored in storage device 305. Memory 345 may also be accessible by direct memory access (DMA) from devices other than computational storage unit 135. Memory 345 may include local memory similar to memory 115 of FIG. 1, on-chip memory (which may be faster than memory such as memory 115 of FIG. 1, but perhaps more expensive to produce), or both.

Computational storage unit 135 may also include DMA 350. DMA 350 may be used to access memories in devices other than computational device 310-1: for example, memory 115 of FIG. 1 or memories of other storage devices 120 of FIG. 1 or other computational storage units 135 of FIG. 1.

Depending on the implementation, memory 345 and/or DMA 350 may be omitted, as shown by the dashed lines.

While FIG. 3A shows storage device 305 and computational device 310-1 as being separately reachable across fabric 355, embodiments of the disclosure may also include storage device 305 and computational device 310-1 being serially connected. That is, commands directed to storage device 305 and computational device 310-1 might both be received at the same physical connection to fabric 355 and may pass through one device to reach the other. For example, if computational device 310-1 is located between storage device 305 and fabric 355, computational device 310-1 may receive commands directed to both computational device 310-1 and storage device 305: computational device 310-1 may process commands directed to computational device 310-1, and may pass commands directed to storage device 305 to storage device 305. Similarly, if storage device 305 is located between computational device 310-1 and fabric 355, storage device 305 may receive commands directed to both storage device 305 and computational device 310-1: storage device 305 may process commands directed to storage device 305 and may pass commands directed to computational device 310-1 to computational device 310-1.

Services 335-1 and 335-2 may offer a number of different functions that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions. Table 1 lists some examples of services that may be offered by processor(s) 330.

TABLE 1

Service Types

Compression
Encryption
Database filter
Erasure coding
RAID
Hash/CRC
RegEx (pattern matching)
Scatter Gather
Pipeline
Video compression
Video decompression
Data deduplication
Operating System Image Loader
Container Image Loader
Berkeley packet filter (BPF) loader
FPGA Bitstream loader
Large Data Set As discussed above, processor(s) 330 (and, indeed, computational device 310-1) may be implemented in any desired manner. Example implementations may include a local processor, such as a CPU or some other processor (such as an FPGA, an ASIC, or a SoC), a GPU, a GPGPU, a DPU, an NPU, an NIC, or a TPU, among other possibilities. Processor(s) 330 may also be implemented using an FPGA or an ASIC, among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Some embodiments of the disclosure may include other mechanisms to communicate with storage device 305 and/or computational device 310-1. For example, storage device 305 and/or computational device 310-1 may include network interface 360, which may support communication with other devices using Ethernet, RDMA, TCP/IP, InfiniBand, SAS, ISCSI, or SATA, among other possibilities. Network interface 360 may provide another interface for communicating with storage device 305 and/or computational device 310-1. While FIG. 3A shows network interface 360 as providing communication to computational device 310-1, embodiments of the disclosure may include a network interface to storage device 305 as well. In addition, in some embodiments of the disclosure, such other interfaces may be used instead of host interfaces 325 and/or 340 (in which case host interfaces 325 and/or 340 may be omitted). Other variations, shown in FIGS. 3B-3D below, may also include such interfaces.

Figure 3B:
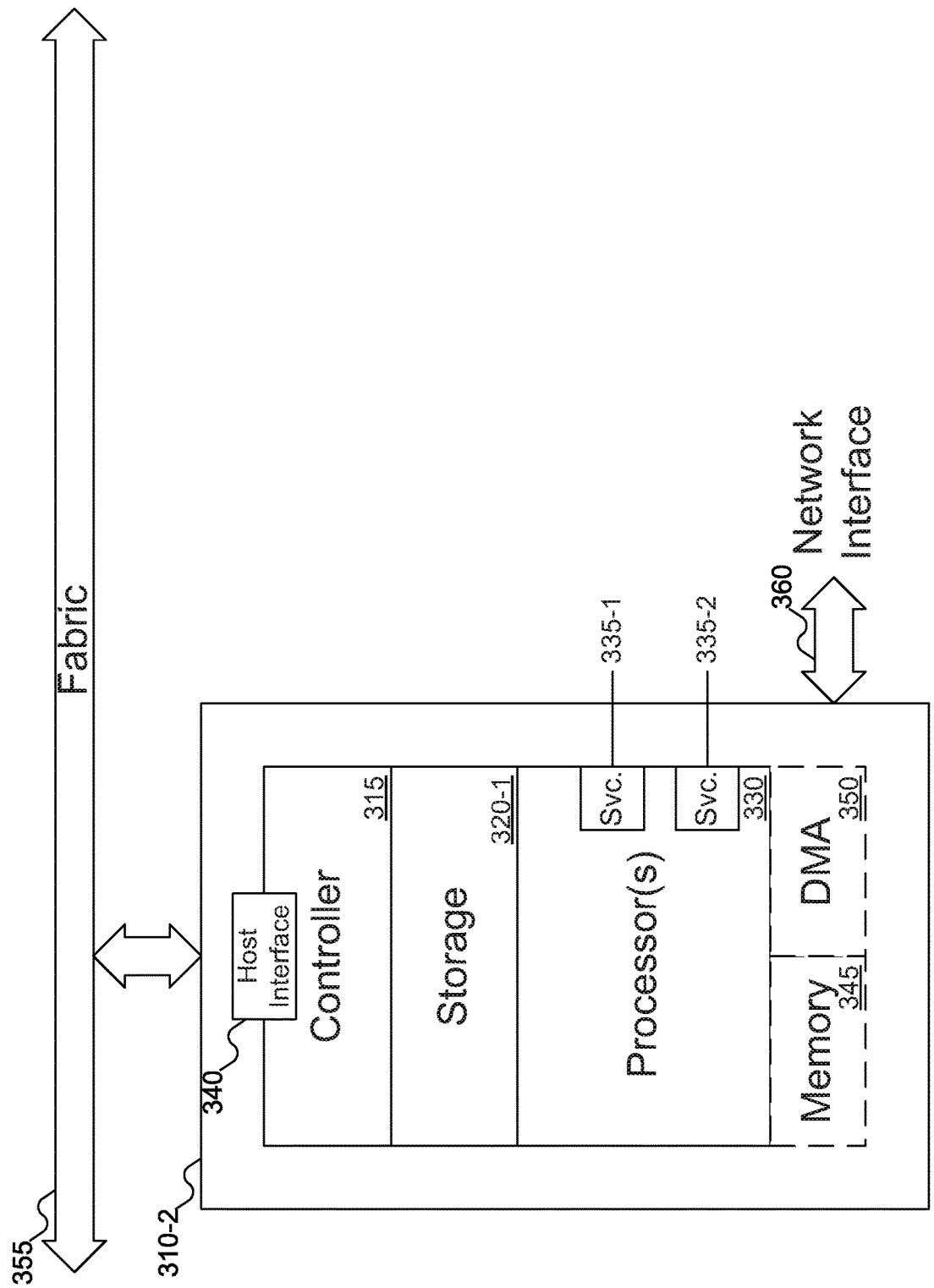
FIG. 3B shows a second example implementation of the computational storage unit of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, processor(s) 330 offering services 335-1 and 335-2, memory 345, and/or DMA 350. As with storage device 305 and computational device 310-1 of FIG. 3A, management and I/O commands may be received via host interface 340 and/or network interface 360. Even though computational device 310-2 is shown as including both storage and processor(s) 330, FIG. 3B may still be thought of as including a storage device that is associated with a computational storage unit.

Figure 3C:
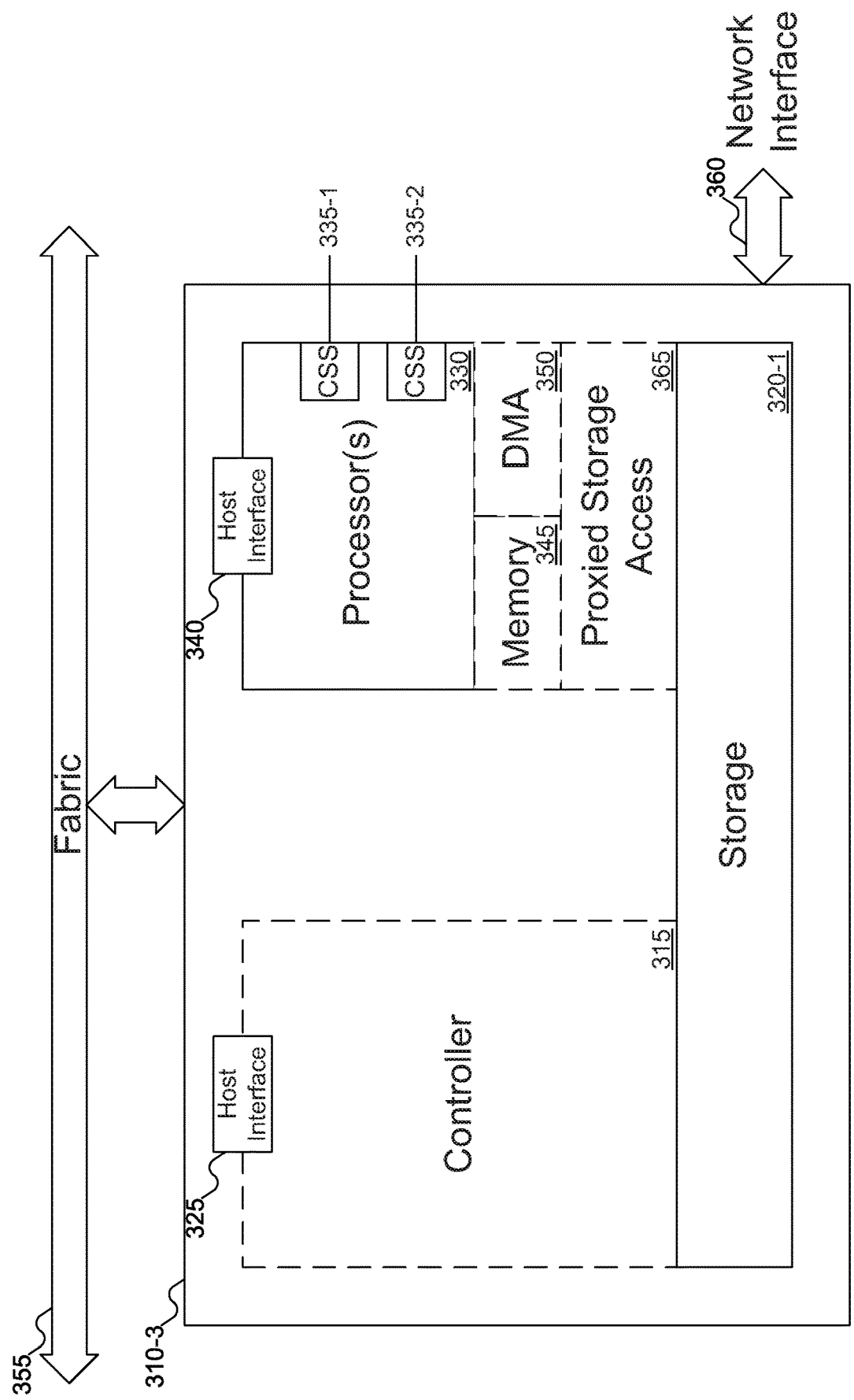
FIG. 3C shows a third example implementation of the computational storage unit of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2, memory 345, and/or DMA 350. But even though computational device 310-3 may be thought of as a single component including controller 315, storage 320-1, processor(s) 330 (and also being thought of as a storage device associated with a computational storage unit), memory 345, and/or DMA 350, unlike the implementation shown in FIG. 3B controller 315 and processor(s) 330 may each include their own host interfaces 325 and 340 and/or network interface 360 (again, which may be used for management and/or I/O). By including host interface 325, controller 315 may offer transparent access to storage 320-1 (rather than requiring all communication to proceed through processor(s) 330).

In addition, processor(s) 330 may have proxied storage access 365 to storage 320-1. Thus, instead of routing access requests through controller 315, processor(s) 330 may be able to directly access the data from storage 320-1.

In FIG. 3C, both controller 315 and proxied storage access 365 are shown with dashed lines to represent that they are optional elements, and may be omitted depending on the implementation.

Figure 3D:
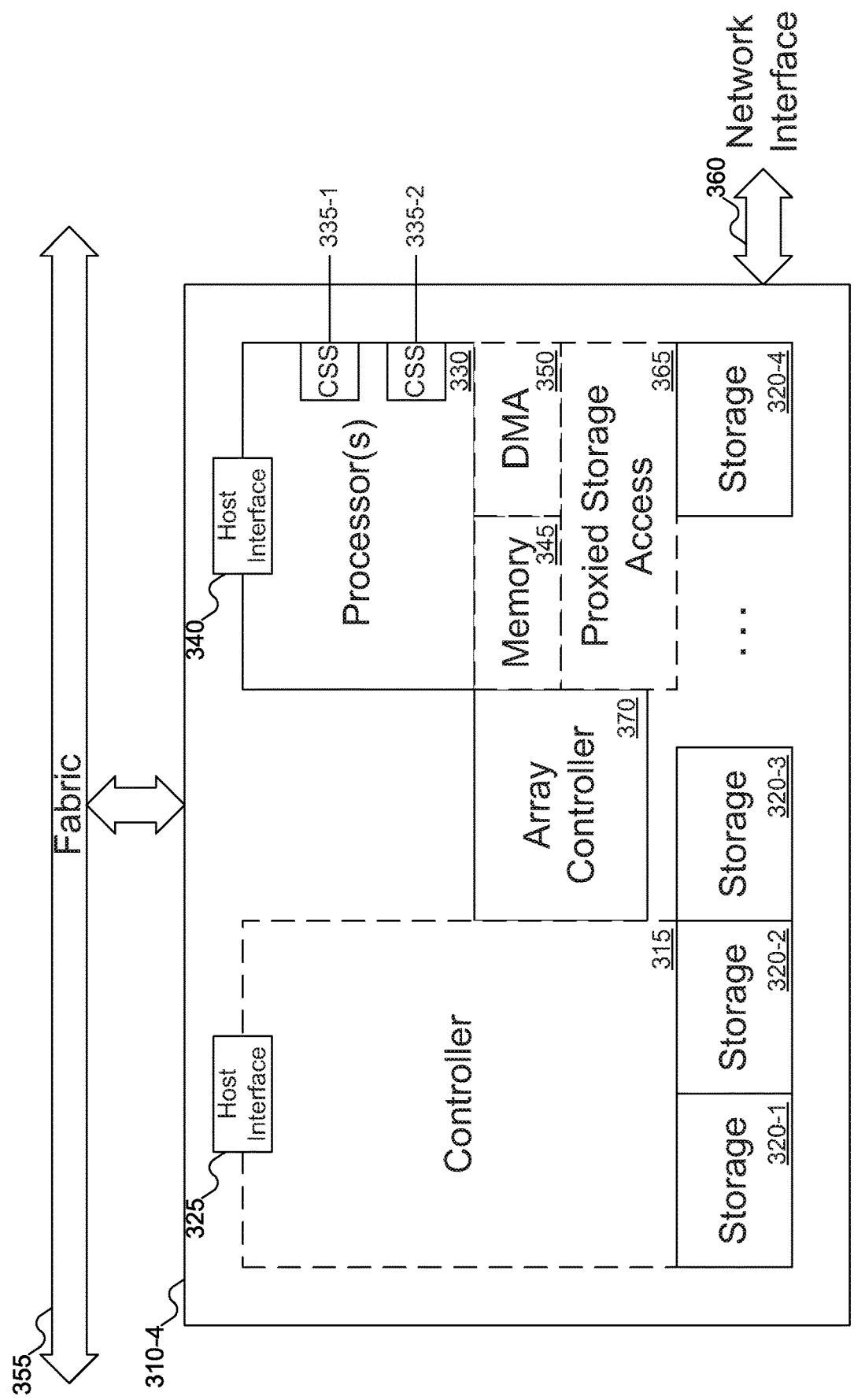
FIG. 3D shows a fourth example implementation of the computational storage unit of FIG. 1, according to embodiments of the disclosure.

Finally, FIG. 3D shows yet another implementation. In FIG. 3D, computational device 310-4 is shown, which may include controller 315, memory 345, DMA 350, and proxied storage access 365 similar to FIG. 3C. In addition, computational device 310-4 may include an array of one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 370. Array controller 370 may manage how data is stored on and retrieved from storage elements 320-1 through 320-4. For example, if storage elements 320-1 through 320-4 are implemented as some level of a Redundant Array of Independent Disks (RAID), array controller 370 may be a RAID controller. If storage elements 320-1 through 320-4 are implemented using some form of Erasure Coding, then array controller 370 may be an Erasure Coding controller.

Figure 4:
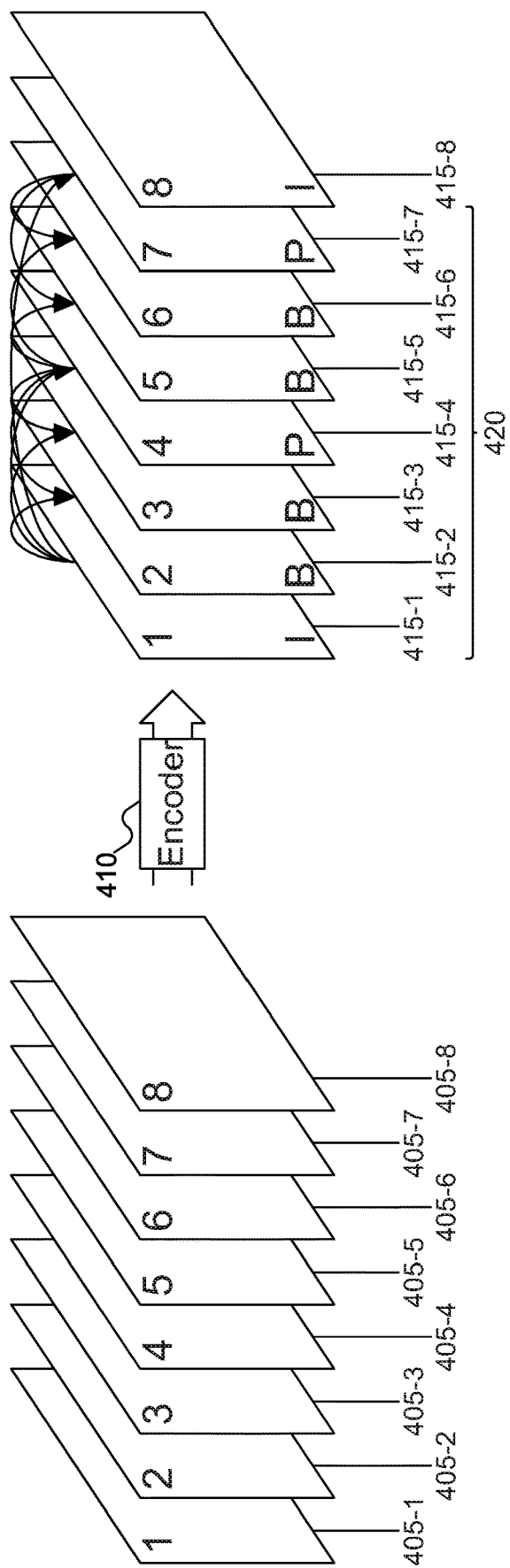
FIG. 4 shows a set of frames of images taken by the camera of FIG. 1 being encoded, according to embodiments of the disclosure.

FIG. 4 shows a set of frames of images taken by camera 150 of FIG. 1 being encoded, according to embodiments of the disclosure. In FIG. 4, camera 150 of FIG. 1 may take individual images 405-1 through 405-8 (which may be referred to collectively as images 405). These images (which may also be called frames or pictures) may be raw images (that is, uncompressed and/or unencoded). It should be understood a camera, such as camera 150 of FIG. 1, might not be capable of recording analog video (that is, continuous video). Instead, camera 150 of FIG. 1 may capture a sequence of images, such as images 405. Camera 150 of FIG. 1 may operate at a particular frame rate, capturing images at regular intervals: for example, 24, 30, 60, or 120 frames per second. If the images are presented quickly enough, the human eye and the human brain may blur the images together to produce what is perceived as continuous video, even though images 405 themselves may be discrete snapshots.

But storing each image 405 might require significant storage resources. For example, assume that each image 405 is 640 pixels wide by 480 pixels high. 640×480, or Video Graphics Array (VGA) resolution, was common enough in the past, but is now considered to be a relatively low resolution, with High Definition (HD) resolution of 1280× 720, Full HD resolution of 1920×1080, Wide Quad High Definition (WQHD) resolution of 2560×1440, 4K resolution of 4096×2160 being more common today, and with 8K Full Format resolution of 8192×4320 slowing being adopted as well. This means that at 640×480 resolution, each image has 370,200 pixels; at 8192×4320 resolution, each image has 35,389,440 pixels. If 24-bit color is used (including 8 bits each for how much red, green, and blue is in the pixel), then 3 bytes are needed to store each pixel. This means that at 640×480 resolution, 921,600 bytes are needed just to store a single image 405 (almost one megabyte (MB)), and at 8192×4320 resolution, 106,168,320 bytes (more than 100 MB) are needed for a single image 405.

What the human eye and human brain process as motion (such as may be seen on a television screen or in a movie) is actually a series of individual still images taken at a frame rate: for example, 24, 30, 60, or 120 frames per second. If the images are presented quickly enough, the human eye and the human brain may blur the images together and "perceive" the image sequence as motion. Thus, even if camera 150 itself might not be able to capture analog video, the human eye and the human brain might be "tricked" into thinking video is captured in the sequence of images 405. But this means that multiple images 405 may be used to represent video data captured over time.

If 60 images are captured per second (the standard frame rate for television), then at 640×480 resolution a single second of video would require 55,296,000 (approximately 55 MB) of storage, and at 8192×4320 resolution, a single second of video would require 6,370,099,200 (6 gigabytes (GB)) of storage. While storage capacities today are trending into terabytes (TB) of storage even for home systems, and enterprise systems might offer petabytes (PB) of storage, storing significant amounts of raw video data may strain even large storage systems.

Thus, it is not unusual for video data to be encoded, to reduce the amount of storage needed for the video data. In FIG. 4, encoder 410 may encode images 405 into frames 415-1 through 415-8 (which may be referred to collectively as frames 415). (Earlier, the terms "image" and "frame" were considered equivalent. This equivalency is still considered to hold, the terms are "image" and "frame" distinguished only to represent unencoded images ("images") with encoded images ("frames").) Typically, encoder 410 may be a part of camera 150 of FIG. 1, although in some embodiments of the disclosure, processor 110 of FIG. 1 or a dedicated encoder 410 may be used to encode images 405 into frames 415. Encoder 410 is an example encoder, and is presented to describe encoding at a high level: embodiments of the disclosure may apply any desired encoding approach, without limitation.

Encoder 410 may identify various frames, and may assign them different types. For example, frames 415-1 and 415-8 are identified as intra frames (or I-frames or keyframes), frames 415-2, 415-3, 415-5, and 415-6 are identified as bidirectional frames (or B-frames), and frames 415-4 and 415-7 are identified as predictive frames (or P-frames). I-frames may be coded in their entirety, without reference to other frames.

P-frames may be encoded as derivable from one other frame: for example, P-frames 415-4 and 415-7 may each be derivable from I-frame 415-1. While FIG. 4 shows P-frames 415-4 and 415-7 as both derivable from I-frame 415-1, in some embodiments of the disclosure one P-frame may be derivable from another P-frame: for example, P-frame 415-7 might be derivable from P-frame 415-4. In some embodiments of the disclosure, a P-frame may be derived from an earlier frame; in other embodiments of the disclosure, a P-frame may be derived from either an earlier frame or a later frame.

B-frames may be encoded as derivable from two other frames: one that comes before the B-frame and one that comes after the B-frame. For example, B-frames 415-2 and 415-3 may each be derivable from I-frame 415-1 and P-frame 415-4, and B-frames 415-5 and 415-6 may each be derivable from P-frames 415-4 and 415-7. While FIG. 4 does not show B-frames as derivable from just I-frames or from other B-frames, in some embodiments of the disclosure, B-frames may be derived from just I-frames, or may be derived from other B-frames.

Because I-frames may be coded in their entirety, there may be no effective storage reduction when comparing frames 415-1 and/or 415-8 with images 405-1 and/or 405-8, respectively. (But in some embodiments of the disclosure, frames 415-1 and/or 415-8 may still be encoded or compressed in some manner, and thus might use less storage than images 405-1 and/or 405-8.) P-frames, being derivable from I-frames (or potentially other P-frames), may reduce the storage space, since it may be possible to store P-frames as a difference relative to another frame. B-frames, being derivable from multiple frames, may further reduce the storage space. But because P-frames and B-frames are encoded, to display these frames may involve decoding the frames before they are displayed.

Figure 5:
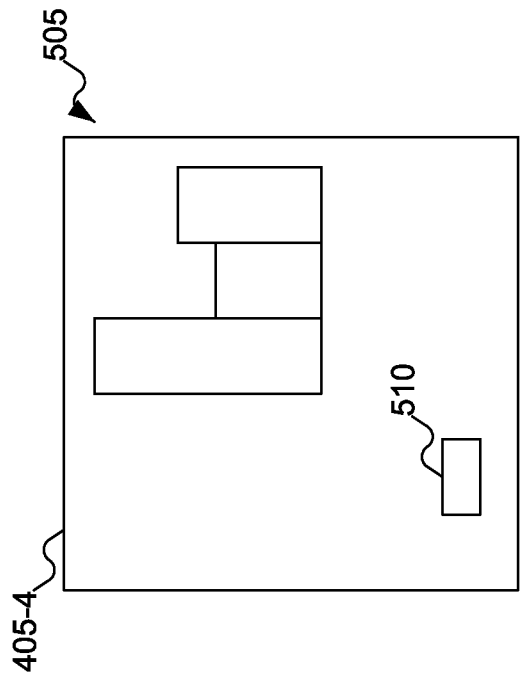
FIG. 5 shows how a frame of FIG. 4 may be encoded by the encoder of FIG. 4, according to embodiments of the disclosure.
Figure 5:
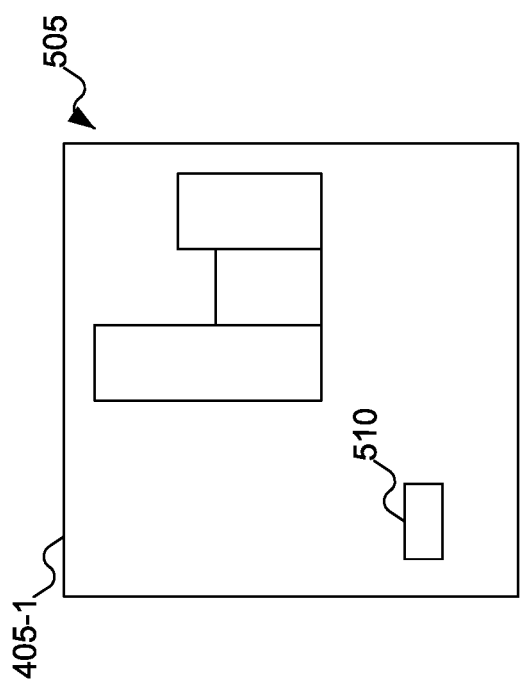

FIG. 5 shows how frames 415 of FIG. 4 may be encoded by encoder 410 of FIG. 4, according to embodiments of the disclosure. In FIG. 4, images 405-1 and 405-4 are shown. As may be seen, images 405-1 and 405-4 may each include background 505, which may be unchanged between images 405-1 and 405-4 (as might occur if, for example, camera 150 of FIG. 1 is not moving). In contrast, foreground 510 (for example, a vehicle or a person) might be moving. As can be seen by comparing images 405-1 and 405-4, foreground 510 has moved to the right and down between images 405-1 and 405-4. (For purposes of this discussion, the terms "background" and "foreground" are used to distinguish between portions of images 405-1 and 405-4 that are moving and portions that are not moving. From the perspective of a lens (such as may be found in camera 150 of FIG. 1 or the human eye), the portion of images 405-1 and 405-4 that are moving might be toward the "front" of images 405-1 and 405-4, while portions of images 405-1 and 405-4 that are not moving might be toward the "back" of images 405-1 and 405-4.)

Encoder 410 of FIG. 4 may detect that background 505 is unmoving and foreground 510 is moving by comparing portions of images 405-1 and 405-4. For example, encoder 410 of FIG. 4 may divide image 405-1 into macroblocks (a rectangular or other shape including some number of pixels: for example, a 10×10 two-dimensional array of pixels) and compare a macroblock of image 405-1 with macroblocks of image 405-4. If a macroblock of image 405-1 may be located in the same position in image 405-4, then that macroblock may be considered part of background 505. If a macroblock of image 405-1 may be found in image 405-4 but in a different position, then that macroblock may be considered part of foreground 510.

Once the parts of images 405-1 and 405-4 that are moving and are not moving have been identified, encoder 410 of FIG. 4 may indicate that frame 415-4 of FIG. 4 may be derived from frame 415-1 of FIG. 4, changing only the pixels in foreground 510: the remaining pixels of frame 415-4 of FIG. 4 may be copied from frame 415-1 of FIG. 4. This encoding of frame 415-4 of FIG. 4 may reduce the amount of data stored for P-fame 415-4 of FIG. 4.

A similar analysis may be used to derive B-frames 415-2, 415-3, 415-5, and 415-6 of FIG. 4, except that two images 405 of FIG. 4 may be used instead of just one image 405 of FIG. 4.

Returning to FIG. 4, given that there may be a reduction in the amount of storage needed for video data, the question might arise why various frames (such as I-frames 415-1 and 415-8) are fully coded. There are a number of reasons why I-frames might be periodically inserted in frames 415.

First, if the video includes a scene change (as might happen in a television program or a movie), there might be nothing in common between the first image of a new scene and images in the previous scene. Thus, when there is a scene change, it may be helpful to simply start with an I-frame rather than trying to derive that frame from earlier frames in the video data.

Second, even if the scene does not change (as might happen, for example, if camera 150 of FIG. 1 is a security camera with a fixed field of view), someone viewing the video might want to scroll through the video, searching for content that might be of interest. If all frames in the encoded video data were derived from earlier frames, then creating a thumbnail image for the user as the user scrolls through the data would require decoding the frames. If an I-frame is periodically inserted, that I-frame may be used to create the thumbnail image, which may reduce the processing load on machine 105 of FIG. 1.

Third, while ideally frames 415 are perfectly encoded, it might happen that an error occurs. Such an error might occur, for example, when encoder 410 is performing the encoding, or as the data is stored on storage device 120 of FIG. 1 or computational storage unit 135 of FIG. 1 (storage device 120 of FIG. 1 or computational storage unit 135 of FIG. 1 might have errors introduced for any number of reasons, such as row hammer, read data disturbance, an error when the data is written, or an error when the data is read). If an error occurs in a frame, that error may propagate to other frames derived from that frame. For example, if frame 415-1 accidentally includes an error, that error may propagate to frames 415-2 through 415-7. By including I-frames occasionally, errors that occur in earlier frames may eventually be filtered out, limiting the impact of the error.

An I-frame, and the frames that may be derived from that I-frame, may be termed a group of pictures. For example, frames 415-1 through 415-7 may be identified as group of pictures 420. Frame 415-8 may be part of the next group of pictures. The length of group of pictures 420 may thus be understood to be the number of frames from one I-frame to another. Alternatively, since each images 405 may be taken at discrete intervals of time, the length of group of pictures 420 may be understood as the amount of time used to capture (or display) group of pictures 420. For example, if images 405 are taken at a rate of 30 per second (a frame rate), if group of pictures 420 includes a total of 60 frames, the length of group of pictures 420 may be understood as being two seconds of video. The concept of a group of pictures may be relevant in how storage system 145 of FIG. 1 operates, as described below.

As encoder 410 may be responsible for encoding the video stream, encoder 410 may be responsible for determining the number of frames in group of pictures 420. Encoder 410 may use information, such as the resolution of images 405, the bit rate to be used when streaming the encoded video data, and/or the frame rate used by camera 150 of FIG. 1 (for example, 24, 30, 60, or 120 frames per second) in determining the number of frames in group of pictures 420. For example, if the size of group of pictures 420 is too large, to support replay of the video data at a target bit rate might require quantization, which can be seen a blurring of the data to the user. Since quantization may not be desirable, the size of group of pictures 420 may be selected in part to achieve a target bit rate for replay of the video data.

Figure 6:
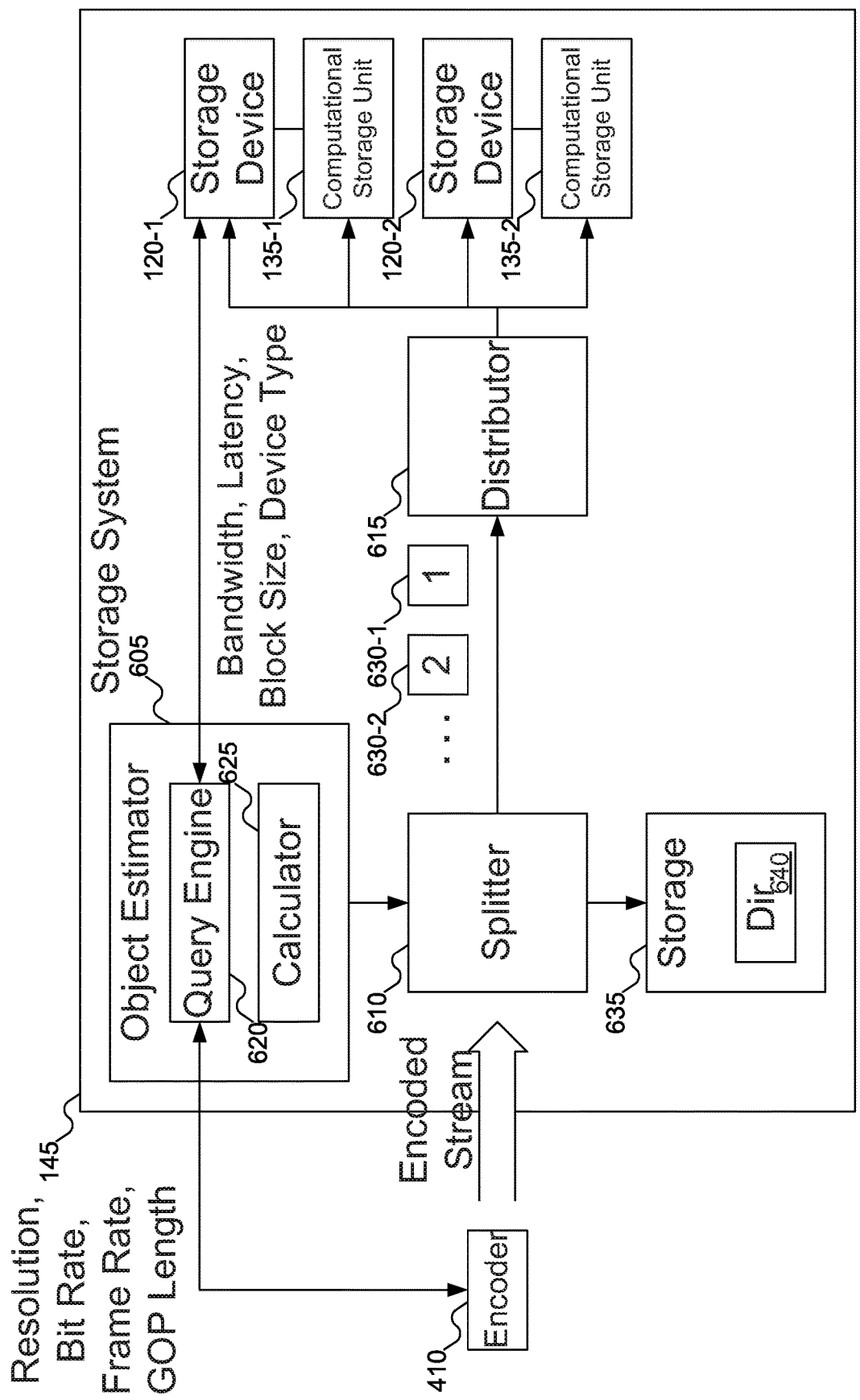
FIG. 6 shows details of the storage system of FIG. 1, according to embodiments of the disclosure.

FIG. 6 shows details of storage system 145 of FIG. 1, according to embodiments of the disclosure. In FIG. 6, storage system 145 may include object estimator 605, splitter 610, distributor 615 and storage devices 120-1 and 120-2 (which may be referred to collectively as storage devices 120) and/or computational storage units 135-1 and 135-2 (which may be referred to collectively as computational storage units 135).

Object estimator 605 may determine the chunk size to be used. A chunk may be defined as one or more groups of pictures 420 of FIG. 4. The chunk size (that is, the number of groups of pictures 420 of FIG. 4 in a chunk) as determined by object estimator 605 may depend on any number of properties. These properties may be established by encoder 410, storage devices 120 and/or computational storage units 135.

Object estimator 605 may include query engine 620. Query engine 620 may query encoder 410, storage devices 120 and/or computational storage units 135 to determine the properties relevant in determining the chunk size. For example, query engine 620 may query encoder 410 for information such as the resolution of images 405 of FIG. 4, the bit rate to be used when streaming the encoded video data, the frame rate used by camera 150 of FIG. 1, and/or the number of frames in group of pictures 415 of FIG. 4. Query engine 620 may also query storage devices 120 and/or computational storage units 135 for various properties, such as the bandwidths supported by storage devices 120 and/or computational storage units 135, the latencies of storage devices 120 and/or computational storage units 135, the size of blocks or sectors in storage devices 120 and/or computational storage units 135, and the types of storage devices 120 and/or computational storage units 135 (such as sector-based storage, block-based storage, or object storage). Note that each storage device 120 and/or computational storage unit 135 might have different properties. Thus, while FIG. 6 shows query engine 620 querying only storage device 120-1, query engine 620 may query each storage device 120 and/or computational storage unit 135 for its set of properties. Put another way, storage device 120-1 might return a first set of properties, computational storage unit 135-1 might return a second set of properties, storage device 120-2 might return a third set of properties, and computational storage unit 135-2 might return a fourth set of properties. While the above discussion implies that query engine 620 might query just storage device 120-1 or might query all storage devices 120 and/or computational storage units 135, embodiments of the disclosure may support querying other sub-combinations of devices. For example, if each storage device 120 is of an identical type and each computational storage unit 135 is of an identical type, query engine 620 might query just one of storage devices 120 and just one of computational storage units 135 for their respective sets of properties. Or, if computational storage units 135 include accelerators 140 of FIG. 1 but rely on storage devices 120 for storing frames 415 of FIG. 4, then query engine 620 might not query computational storage units 135 for any properties (which might not be relevant in calculating the chunk size).

Once query engine 620 has received the various sets of properties, calculator 625 may take these sets of properties and use that information to calculate the chunk size. Calculator 625 may use any sub-combination of properties from the sets of properties provided by encoder 410, storage devices 120, and/or computational storage units 135, and may use such properties in any desired manner to calculate the chunk size. For example, if the number of frames in group of pictures 420 of FIG. 4 is relatively large, then calculator 625 may return a smaller chunk size to reduce the amount of data to be processed when decoding the video data. Or, if the block size of storage devices 120 and/or computational storage units 135 is large, then it may be possible to store multiple groups of pictures 420 of FIG. 4 in a single block, which may be more efficient for decoding. In general, properties of encoder 410 that may lead to larger sizes for group of pictures 420 of FIG. 4 may suggest smaller chunk sizes, and properties of encoder 410 that may lead to smaller sizes for group of pictures 420 of FIG. 4 may suggest larger chunk sizes. Similarly, properties of storage devices 120 and/or computational storage units 135 that enable more rapid processing of data may suggest larger chunk sizes, and properties of storage devices 120 and/or computational storage units 135 that prevent more rapid processing of data may suggest smaller chunk sizes. In addition, in some embodiments of the disclosure, some properties of any of encoder 410, storage devices 120 and/or computational storage units 135 may effectively "trump" other properties and control how calculator 625 calculates the chunk size.

Another factor that calculator 625 may consider in determining the chunk size may be whether all storage devices 120 in storage system 145 include associated computational storage units 135 (or, alternatively, storage system 145 includes only computational storage units 135 and no storage devices 120 that do not have associated accelerators). If not every storage device 120 in storage system 145 has an associated accelerator, then storing chunks of data on those storage devices may involve having an accelerator in another computational storage unit 135 process the data on that storage device. In that situation, the load on the various accelerators 140 of FIG. 1 might vary, and a smaller chunk size might benefit overall processing and smooth streaming of the data. Alternatively, chunks that may need to be processed might be stored only on storage devices that have associated accelerators, rather than being distributed across all available storage devices 120 and/or computational storage units 135 in storage system 145.

Once the chunk size has been calculated, splitter 610 may use the chunk size to divide the encoded video data (the encoded stream) into chunks 630-1 and 630-2 (which may be referred to collectively as chunks 630). While FIG. 6 shows two chunks, embodiments of the disclosure may support any number of chunks, which may be understood to be a consequence of both the number of groups of pictures 420 of FIG. 4 in the encoded stream and the chunk size. Chunks 630 may then be provided to distributor 615. Distributor 630 may distribute chunks 630 among storage devices 120 and/or computational storage units 135 using any desired chunk distribution strategy. For example, the chunk distribution strategy may be a chunk round robin distribution strategy, with the first chunk stored on storage device 120-1, the second chunk stored on storage device 120-2, the third chunk stored on storage device 120-1, the fourth chunk stored on storage device 120-2, and so on. (This example assumes that computational storage units 135 only provide acceleration services and not storage.) Any chunk distribution strategy may be used to distribute chunks 630 among storage devices 120 and/or computational storage units 135.

The above discussion may suggest that the chunk size is constant for all chunks in the encoded stream in storage system 145. That is, once the number of groups of pictures 420 of FIG. 4 is calculated by object estimator 605, all chunks 630 in the encoded stream in storage system 145 have the same size. In some embodiments this conclusion may be correct. For example, if storage devices 120/computational storage units 135 have sets of properties that are roughly the same, and storage devices 120/computational storage units 135 are all block storage devices, then it makes sense for each chunk to have approximately the same amount of data, which may be achieved by using a consistent chunk size.

But in other embodiments of the disclosure, the chunk size may be variable. For example, if different storage devices 120/computational storage units 135 have different properties (such as different block sizes), then variable chunk sizes may be supported. For example, if computational storage unit 135-1 supports a 4 kilobyte (KB) block size, but computational storage unit 135-2 supports a 16 KB block size, computational storage unit 135-2 may store more data per block than computational storage unit 135-1, and it may be appropriate for the chunks to be stored on computational storage unit 135-2 to be larger than the chunks to be stored on computational storage unit 135-1. (Of course, the ability of computational storage unit 135-2 to decode the chunk without affecting the streaming of the data may also be a factor in how large the chunk size may be for each storage device 120/computational storage unit 135.)

Another possibility may be if storage devices 120/computational storage units 135 may support object storage. Devices that support object storage may support internal management of how much data may be stored in a given object, and objects that are too large to be stored in a given unit of storage might be internally split into multiple objects for storage purposes, even though the storage device may give the outward appearance of the data being stored as a single object. In embodiments of the disclosure including object storage devices, variable chunk sizes may also be used, as storage system 145 might not need to be concerned with how the data is stored on the object storage devices.

Storage system 145 may also include storage 635, which may include directory 640. Storage 635 may be a separate storage. For example, storage 635 may be a non-volatile storage, such as flash storage, or it may be a volatile storage, such as RAM. If storage 635 is a volatile storage, directory 640 may be backed up to some non-volatile storage, such as one or more of storage devices 120 and/or computational storage units 135, or some other non-volatile storage not shown in FIG. 6. Directory 640 is discussed further with reference to FIG. 7 below.

FIG. 7 shows details of directory 640 of FIG. 6, according to embodiments of the disclosure. In FIG. 7, directory 640 may store information about which chunks 630 of FIG. 6 are stored on which storage devices 120 of FIG. 1/computational storage units 135 of FIG. 1, and where they are stored on those devices. For example, if chunks 630 of FIG. 6 are stored in files named "filename X", where X is the number of the chunk, then directory 640 may map computational storage unit identifiers 705-1 and 705-2 (which may be referred to collectively as identifiers 705 or storage device identifiers 705 and which may identify computational storage units 135-1 and 135-2 of FIG. 6 respectively), to chunks 630 of FIG. 6 stored on those devices. Thus, for example, entry 710-1 may show that chunks 630 of FIG. 6 numbered 1, 3, and 5 may be stored on computational storage unit 135-1 of FIG. 6, and entry 710-2 may show that chunks 630 of FIG. 6 numbered 2, 4, and 6 may be stored on computational storage unit 135-2 of FIG. 6. Directory 640 may include information about which chunks 630 of FIG. 6 may be associated with each storage device 120 of FIG. 1 and/or computational storage unit 135 of FIG. 1. For example, computational storage unit identifier 705-1 may be associated with chunks 630 of FIG. 6 numbered 1, 3, and 5, as shown by chunk identifiers 715-1, and computational storage unit identifier 705-2 may be associated with chunks 630 of FIG. 6 numbered 2, 4, and 6, as shown by chunk identifier 715-2 (chunk identifiers 715-1 and 715-2 may be referred to collectively as chunk identifiers 715).

While FIG. 7 shows file names for each chunk 630 of FIG. 6, embodiments of the disclosure may use other identifiers for chunks 630 of FIG. 6. For example, logical addresses or some other logical identifiers may be used for each chunk 630 of FIG. 6.

Directory 640 shows computational storage unit identifiers 705 before chunk identifiers 715, which might suggest that directory 640 maps computational storage units to chunks. But if each chunk and each storage device/computational storage unit may have a unique identifier, then the mapping between chunks and storage devices/computational storage units may be bidimensional.

As discussed above, the encoded stream may be divided into clips, and each clip may be divided into chunks. If a clip contains exactly one chunk, then little more may be needed than an association between a clip identifier and the chunk identifier. But if a single clip may include multiple chunks, then directory 640 may map clip identifiers to identifiers for chunks 630 of FIG. 6 that are part of that clip, and which may in turn be mapped to computational storage unit identifiers. Thus, for example, entries 710-1 and 710-2 may show that clip identifier 720-1 may include all of chunks 1 through 6 (or more), even though chunks 1 through 6 may be stored on multiple storage devices/computational storage units.

FIG. 7 also shows entries 710-3 and 710-4, which show that clip 720-2 may include chunks 7 through 12 (shown in chunk identifiers 715-3 and 715-4), which may map to computational storage unit identifiers 705-1 and 705-2. While FIG. 7 only shows four entries 710-1 through 710-4, mapping two clips 720-1 and 720-2 to chunk identifiers 715-1 through 715-4 and to computational storage unit identifiers 705-1 and 705-2, embodiments of the disclosure may include any number of entries, mapping any number of clips to any number of chunks, and from any number of chunks to any number of storage devices and/or computational storage units. (Entries 710-1 through 710-4 may be referred to collectively as entries 710; clips 720-1 and 720-2 may be referred to collectively as clips 720.)

Directory 640 shows clip identifiers 720 before chunk identifiers 715, which might suggest that directory 640 maps clips to chunks. But if each chunk and each clip may have a unique identifier, then the mapping between chunks and clips may be bidimensional.

Directory 640 may also store the order for each chunk identifier 715 associated with each clip identifier 720. In FIG. 7, the names of chunk identifiers 715 may be numbered, which may imply the ordering: for example, as chunks 1 through 6 are all part of the clip identified by clip identifier 720-1, chunk 1 may be the first chunk, then chunk 2, then chunk 3, and so on. But in embodiments of the disclosure where the order of chunks 630 of FIG. 6 in a clip are not necessarily clear, directory 640 may also include information specifying the order of chunks 630 of FIG. 6 for each clip.

While FIG. 7 shows directory 640 storing the various mappings and order information in a single table, embodiments of the disclosure may use any desired data structure, and may split information across any number of data structures. For example, one data structure might map clip identifiers 720 to chunk identifiers 715, while another data structure might map chunk identifiers 715 to computational storage unit identifiers 705.

Figure 8:
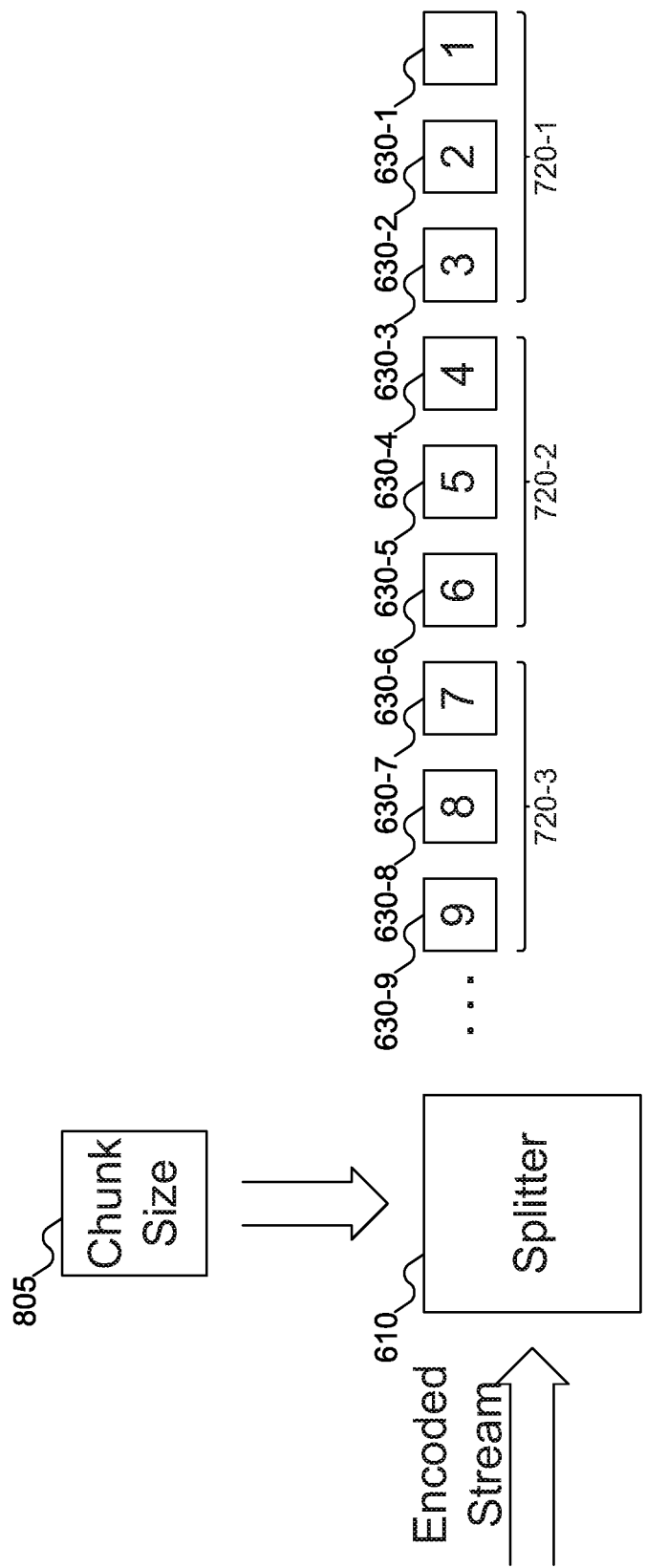
FIG. 8 shows the splitter of FIG. 6 identifying clips in the encoded stream, the clips including multiple chunks, according to embodiments of the disclosure.

FIG. 8 shows splitter 610 of FIG. 6 identifying clips in the encoded stream, the clips including multiple chunks, according to embodiments of the disclosure. In FIG. 8, splitter 610 is shown receiving the encoded stream and chunk size 805 (which may be calculated by object estimator 605 of FIG. 6). The embedded stream may include clips 720-1, 720-2, and 720-3. How clips 720 are determined may depend on the implementation. In some embodiments of the disclosure, encoder 410 of FIG. 4 may divide the embedded stream into clips 720 based on identifying frames that include no or essentially no common macroblocks. In other embodiments of the disclosure, encoder 410 of FIG. 4 may divide the embedded stream into clips 720 using some predetermined number of groups of pictures 420 of FIG. 4: every n groups of pictures 420 of FIG. 4, for some value of n, may be considered a clip. In yet other embodiments of the disclosure, encoder 410 of FIG. 4 may use some other approach to divide the embedded stream into clips 720. In still other embodiments of the disclosure, splitter 610 may separate the embedded stream into clips 720, using any of these approaches.

Regardless of which component divides the embedded stream into clips 720 or how such division is done, based on chunk size 805, splitter 610 may divide each clip 720 in the embedded stream into three chunks 630. For example, clip 720-1 is shown as including chunks 630-1, 630-2, and 630-3, clip 720-2 is shown as including chunks 630-4, 630-5, and 630-6, and clip 720-3 is shown as including chunks 630-7, 630-8, and 630-9. These chunks 630 may then be delivered to distributor 615 of FIG. 6 for storage on storage devices 120 of FIG. 1 and/or computational storage units 135 of FIG. 1.

Figure 9:
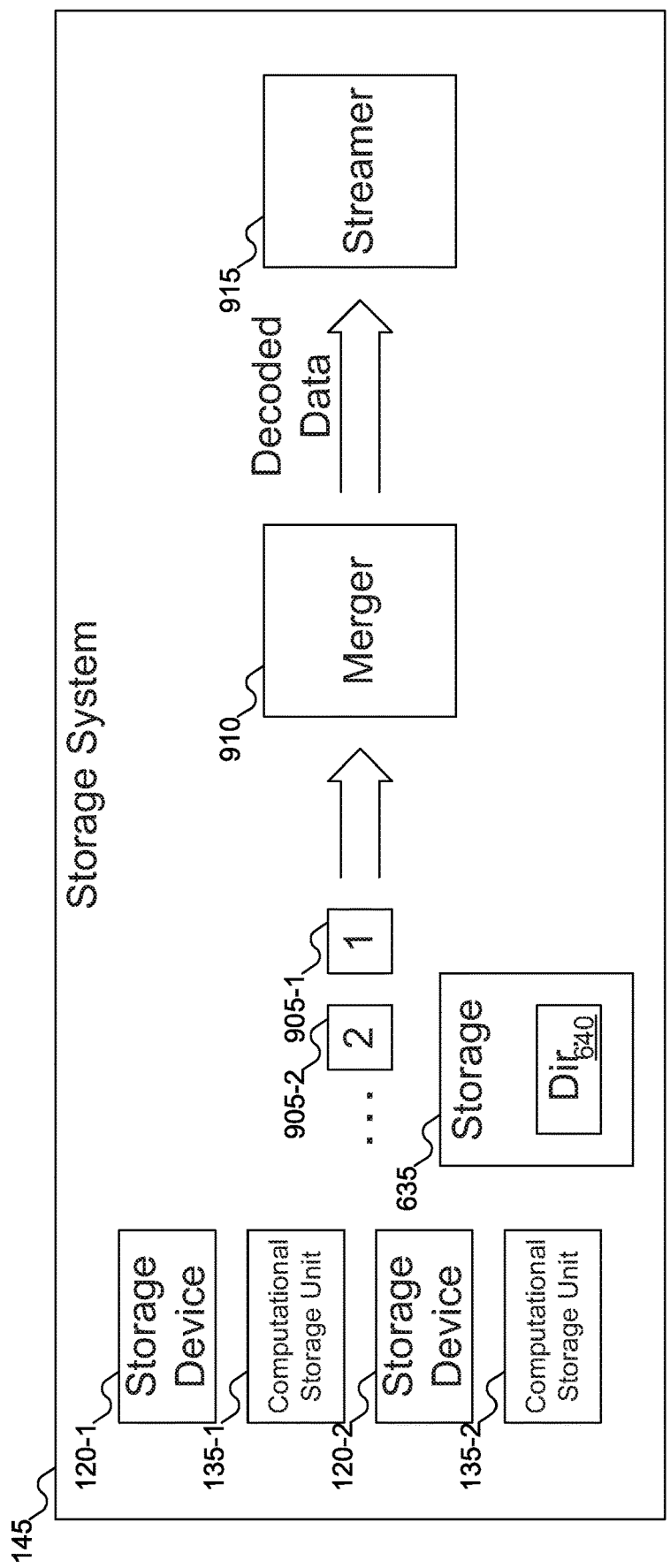
FIG. 9 shows additional details of the storage system of FIG. 1, according to embodiments of the disclosure.

In all of the above discussion, the focus has been on storing the embedded stream across storage devices 120 of FIG. 1 and/or computational storage units 135 of FIG. 1. But as noted above, one reason to do such distribution of the embedded stream across storage devices 120 of FIG. 1 and/or computational storage units 135 of FIG. 1 is to support processing chunks 630 for use of the data contained therein. FIG. 9 shows how such processing may be performed.

FIG. 9 shows additional details of storage system 145 of FIG. 1, according to embodiments of the disclosure. In FIG. 9, storage devices 120 and/or computational storage units 135 may be presumed to store chunks 630 of FIG. 6 for the embedded stream, which have been encoded. When storage system 145 receives a request to replay the stream of data, this request may specify with which clip 720 of FIG. 7 to begin the replay. Storage system 145 may use directory 640 in storage 635 to identify which chunks 630 of FIG. 6 are associated with clip 720 of FIG. 7, and which storage devices 120 and/or computational storage units 135 store those chunks 630 of FIG. 6. Storage system 145 may then request computational storage units 135 to decode the chunks in the order specified. For example, computational storage unit 135-1 might decode chunk 630-1 of FIG. 6, producing decoded data 905-1, computational storage unit 135-2 might decode chunk 630-2 of FIG. 6, producing decoded data 905-2, and so on. (Decoded data 905-1 and 905-2 may be referred to collectively as decoded data 905.)

Once chunks have been decoded to produce decoded data 905, the decoded data may be provided to merger 910. Merger 910 may then use the order information in directory 640 to ensure that decoded data 905 is streamed in the correct order. For example, if decoded data 905-2 were to arrive at merger 910 before decoded data 905-1, merger 910 may hold decoded data 905-2 until decoded 905-1 has been received. Once decoded data 905 is in the correct order (or once the next decoded 905 to be streamed has arrived at merger 910), even if not all decoded data 905 has necessarily arrived at merger 910), merger 910 may deliver decoded data 905, in the correct order, to streamer 915, which may stream decoded data 905 to its destination: for example, a display where the user may review video data, or processor 110 of FIG. 1 if decoded data 905 is to be subject to additional processing.

While the above example focuses on decoding video data, embodiments of the disclosure may include computational storage units 135 performing other processing of chunks 630 of FIG. 6 for the embedded stream. For example, the user might want to view a particular scene or clip that may be identified in some way: computational storage units 135 may search chunks 630 of FIG. 6 to find this desired scene or clip. Or, the video data might represent video captured by a security camera, and the user might be interested in finding an intruder: computational storage units 135 may search chunks 630 of FIG. 6 to find some unexpected movement in the video data, which might represent an intruder. Computational storage units 135 might use customized hardware and/or software to perform such processing.

Figure 10:
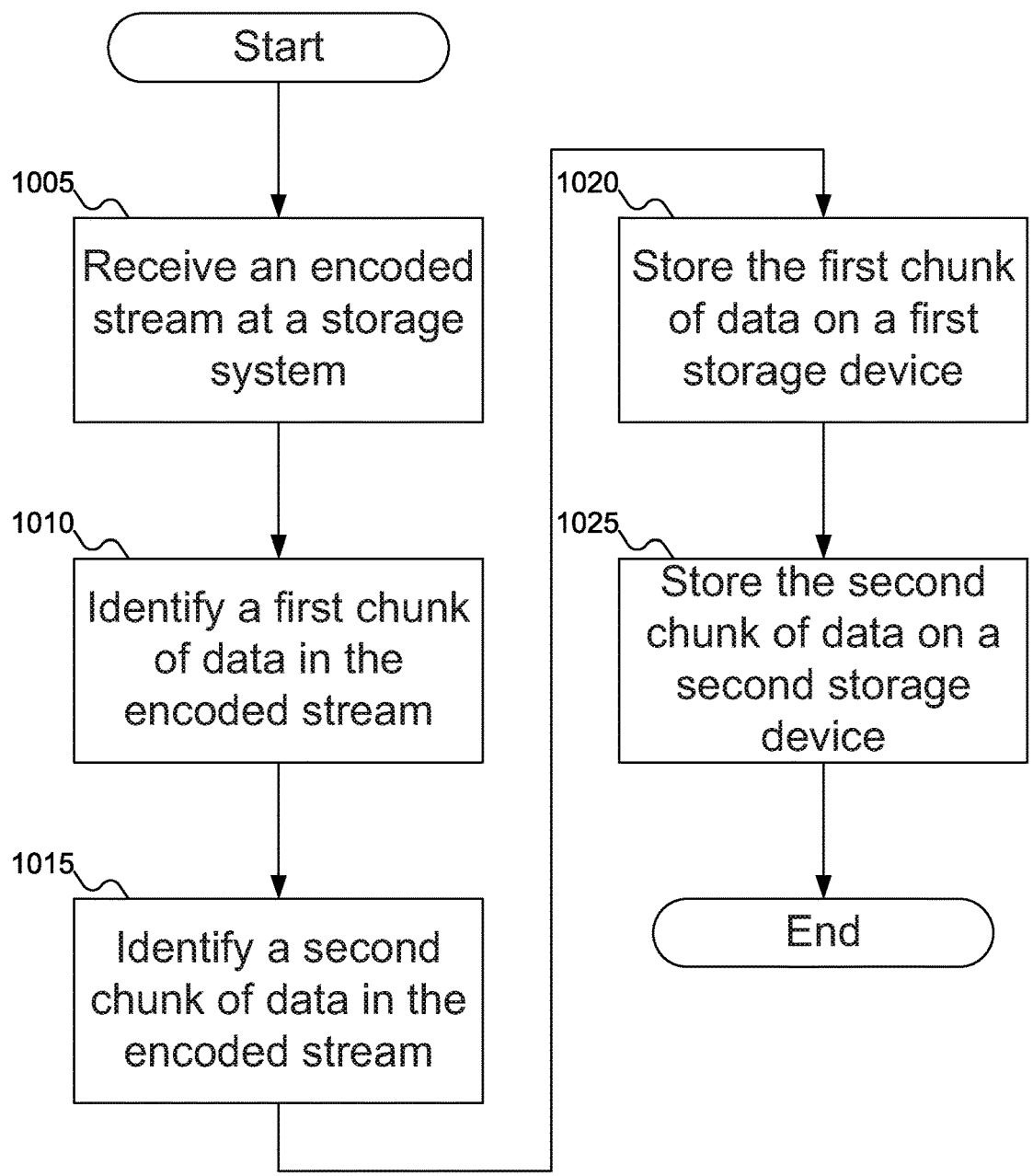
FIG. 10 shows a flowchart of an example procedure for processing an encoded stream using the storage system of FIG. 1, according to embodiments of the disclosure.

FIG. 10 shows a flowchart of an example procedure for processing an encoded stream using storage system 145 of FIG. 1, according to embodiments of the disclosure. In FIG. 10, at block 1005, storage system 145 of FIG. 1 may receive an encoded stream. This encoded stream might be received from, for example, processor 110 of FIG. 1 or camera 150 of FIG. 1. At block 1010, splitter 610 of FIG. 6 may identify a chunk, such as chunk 630-1 of FIG. 6, in the encoded stream. At block 1015, splitter 610 of FIG. 6 may identify another chunk, such as chunk 630-2 of FIG. 6, in the encoded stream. At block 1020, distributor 615 of FIG. 6 may store the first chunk 630-1 of FIG. 6 on one of storage devices 120 of FIG. 1 and/or computational storage units 135 of FIG. 1. At block 1025, distributor 615 of FIG. 6 may store the first chunk 630-1 of FIG. 6 on one of storage devices 120 of FIG. 1 and/or computational storage units 135 of FIG. 1.

Figure 11:
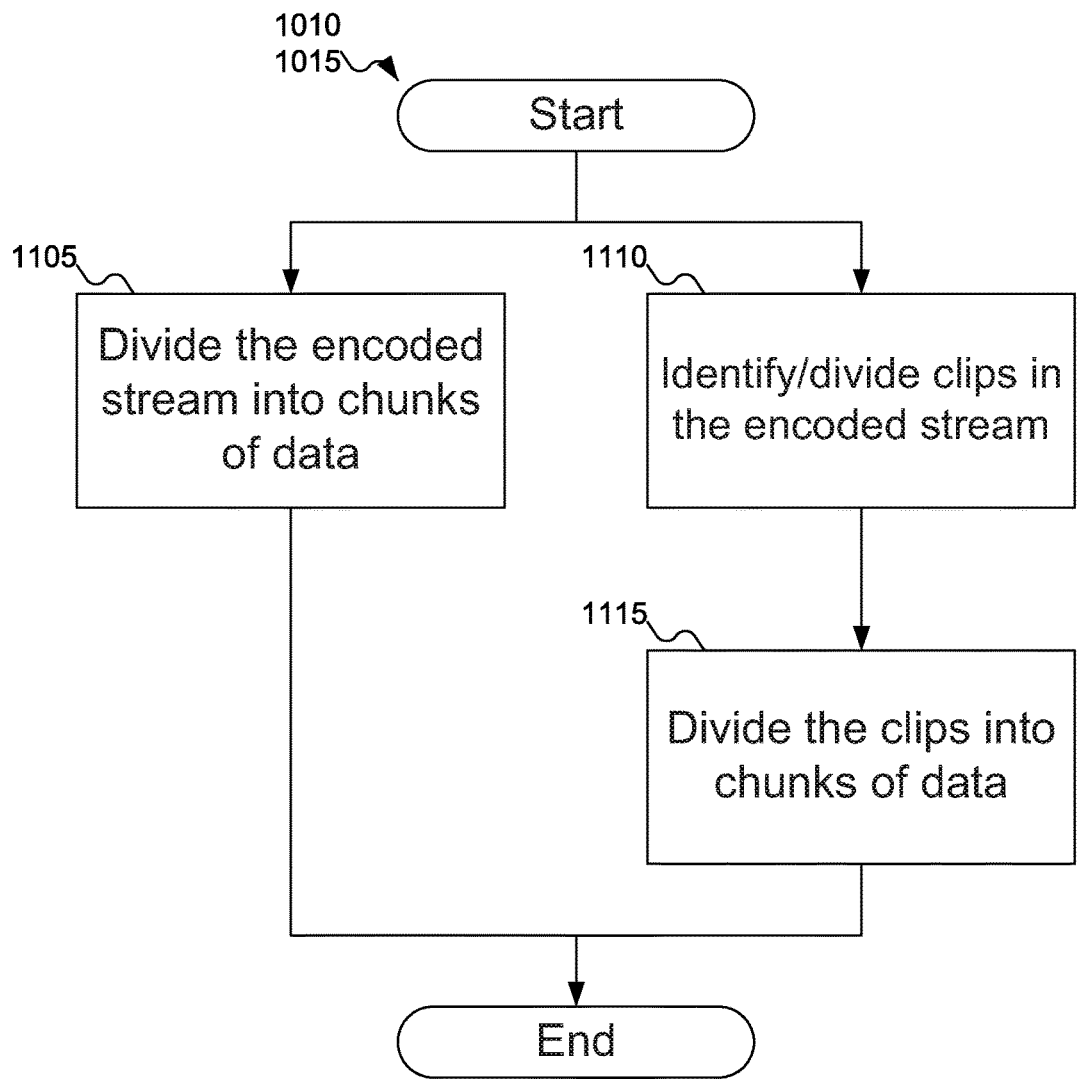
FIG. 11 shows a flowchart of an example procedure for dividing an encoded stream into the chunks of FIG. 6 and/or the clips of FIG. 7, according to embodiments of the disclosure.

FIG. 11 shows a flowchart of an example procedure for dividing an encoded stream into chunks 630 of FIG. 6 and/or clips 720 of FIG. 6, according to embodiments of the disclosure. In FIG. 11, at block 1105, splitter 610 of FIG. 6 may identify chunks 630 of FIG. 6 in the encoded stream. Alternatively, at block 1110, splitter 610 of FIG. 6 may identify clips 720 of FIG. 7 in the encoded stream, and at block 1115, splitter 610 of FIG. 6 may identify chunks 630 of FIG. 6 in clips 720 of FIG. 7. Note that splitter 610 of FIG. 6 or encoder 410 of FIG. 4, or some other source (for example, processor 110 of FIG. 1 or a user) may be responsible for dividing the encoded stream into clips 720 of FIG. 7.

FIG. 12 shows a flowchart of an example procedure for object estimator 605 of FIG. 6 to determine chunk size 805 of FIG. 8, according to embodiments of the disclosure. In FIG. 12, at block 1205, query engine 620 of FIG. 6 may query storage devices 120 of FIG. 1 and/or computational storage units 135 of FIG. 1 for their properties. At block 1210, query engine 620 of FIG. 6 may query encoder 410 of FIG. 4 for the properties used in encoding the encoded stream. Finally, at block 1215, calculator 625 of FIG. 6 may calculate chunk size 805 of FIG. 8 based on the properties of storage devices 120 of FIG. 1, computational storage units 135 of FIG. 1, and/or encoder 410 of FIG. 4.

FIG. 13 shows a flowchart of an example procedure for storing mappings between clips 720 of FIG. 7 and/or chunks 630 of FIG. 6 and storage devices 120 of FIG. 1/computational storage units 135 of FIG. 1, according to embodiments of the disclosure. In FIG. 13, at block 1305, directory 640 of FIG. 6 may map clips 720 of FIG. 7 to chunks 630 of FIG. 6. Note that in some embodiments of the disclosure, block 1305 may be omitted, as shown by dashed line 1310: for example, if the encoded stream is not divided into clips 720 of FIG. 5. At block 1315, directory 640 of FIG. 6 may map chunks 630 of FIG. 6 to storage devices 120 of FIG. 1 and/or computational storage units 135 of FIG. 1. Finally, at block 1320, directory 640 of FIG. 6 may store an order for chunks 630 of FIG. 6.

Figure 14:
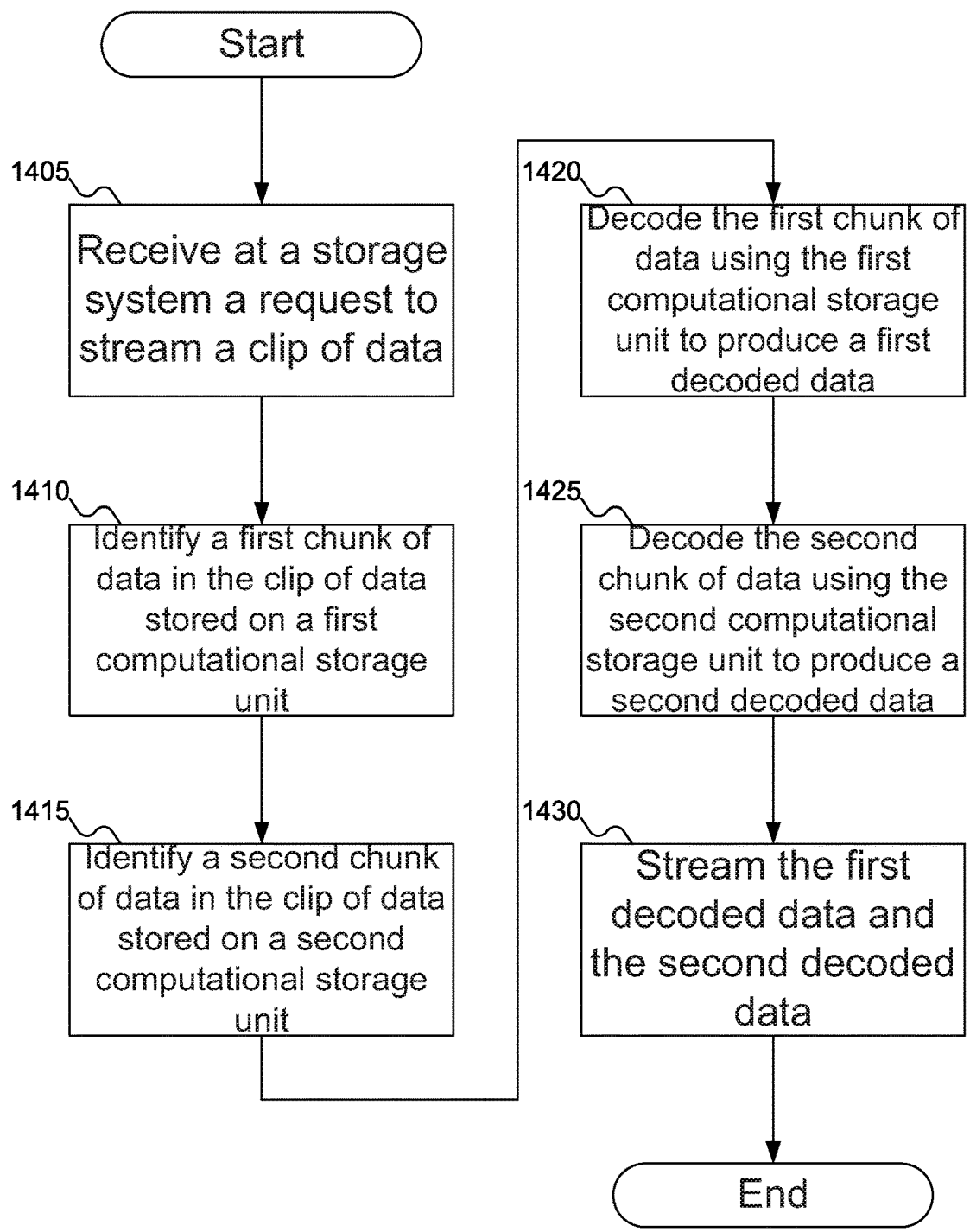
FIG. 14 shows a flowchart of an example procedure for decoding the clips of FIG. 7, according to embodiments of the disclosure.

FIG. 14 shows a flowchart of an example procedure for decoding clips 720 of FIG. 7, according to embodiments of the disclosure. In FIG. 14, at block 1405, storage system 145 of FIG. 1 may receive a request to stream a clip of data. This request may be received from, for example, processor 110 of FIG. 1 or a user. At block 1410, storage system 145 of FIG. 1 may use directory 640 of FIG. 6 to identify a first chunk 630 of FIG. 6 in the requested clip as being stored on a first storage device 120 of FIG. 1 or computational storage unit 135 of FIG. 1. At block 1415, storage system 145 of FIG. 1 may use directory 640 of FIG. 6 to identify a second chunk 630 of FIG. 6 in the requested clip as being stored on a second storage device 120 of FIG. 1 or computational storage unit 135 of FIG. 1. At block 1420, a first computational storage unit 135 of FIG. 1 may decode the first chunk 630 of FIG. 6, to produce decoded data 905 of FIG. 9. At block 1425, a second computational storage unit 135 of FIG. 1 may decode the second chunk 630 of FIG. 6, to produce decoded data 905 of FIG. 9. Finally at block 1430, streamer 915 of FIG. 9 may stream decoded data 905 of FIG. 9 to an appropriate destination that may be identified in the received request.

Figure 15:
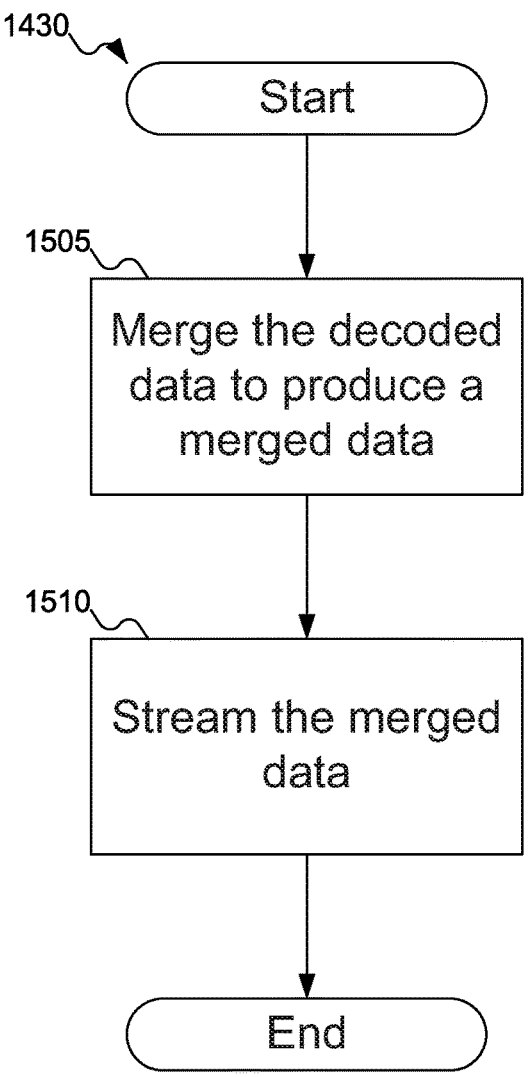
FIG. 15 shows a flowchart of an example procedure for streaming decoded data using the streamer of FIG. 9, according to embodiments of the disclosure.

FIG. 15 shows a flowchart of an example procedure for streaming decoded data 905 of FIG. 9 using streamer 915 of FIG. 9, according to embodiments of the disclosure. In FIG. 15, at block 1505, merger 910 of FIG. 9 may merge decoded data 905 to produce a merged data. Finally, at block 1510, streamer 915 of FIG. 9 may stream the merged data to the appropriate destination.

In FIGS. 10-15, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a storage system including computational storage units. Based on information in a directory, the computational storage units may access and decode chunks of data in an appropriate order for streaming to a destination. The storage system may offer a technical advantage by being able to different chunks of the data using different computational storage units, expediting the decoding and streaming of the data.

At encoding, a number of Group of Pictures (GOPs) to store as a distinct chunk may be determined, considering video type, frame rate, bit rate, and GOP length. The compressed video stream may be split into multiple video clips based on the target number of GOPs. A sequence number (based on the running timestamp in millisecond) may be assigned to each video clip in order. The clip may be padded and may create a chunk aligned to a block size a Computational Storage Drive (CSD) supports if the target CSD is block device. The whole clip or a chunk may be stored to a CSD with a name of filename+sequence number. The clips or chunks may be distributed across multiple CSDs per its distribution policy (e.g., round-robin).

At decoding, each CSD may independently decode the clips or chunks belonging to a video stream. Each decoded video clip associated with sequence number may be sent to a merger. The merger may stitch the uncompressed video clips and restore the original video stream.

Embodiments of the disclosure introduce a storage architecture based on a CSD for non-conversational video encoding with a fixed GOP structure. Some embodiments of the disclosure may allow CSDs to process video clips independently without significant overhead.

In some embodiments of the disclosure, a video encoder such as H.264, H.265, MPEC-2/4 may take an uncompressed video stream and generate a compressed video stream. A video encoder may use the concept of a GOP. A GOP may be understood as a distance between two keyframes, measured in the number of frames or the amount of time between keyframes. For example, if a keyframe is inserted every 1 second into a video at 30 frames per second, the GOP length is 30 frames or 1 second. While real-world GOP lengths may vary by application, the GOP length may be in the range of 0.5-2 seconds.

The concept of the GOP may be useful for several reasons. First, the GOP may be used for random access. Viewers may skip ahead and join live video streams at random points. In order to accommodate this behavior, more keyframes may be placed throughout the video to allow viewers to begin watching from these points. These points may be called random access points.

Second, the GOP may be used for error resiliency. Packets may get lost, bits may be flipped, and all sorts of other errors may happen in the real world. If different from what came before are sent and an error or corruption occurs, that error may continue to propagate through the rest of the video stream until it concludes. Adding additional keyframes throughout a video may provide error resiliency by returning the decoder to a "known good" frame and clearing previous errors that may have been propagating. This may happen while watching videos, where some error is introduced and the screen gets blocky, or green-tinged shapes appear on the screen. Then, suddenly, the picture may return to a crisp and clear image.

Third, the GOP may be used for error scene changes. Sending only differences between frames may work very well when the differences between frames are relatively small. During content changes, or scene cuts, it may be possible for nearly the entire image to be filled with new information from one frame to the next. When this happens, it may not make sense to continue sending only differences. A video encoder may detect this situation and automatically insert a new keyframe at the boundary point. This situation may be called scene change detection.

In other words, a GOP can be used to process video independently. Embodiments of the disclosure extend the usage of GOPs for computational storage devices.

In some embodiments, the existing encoder may be extended to have an additional component called a splitter, or the splitter can exist independently outside of the encoder. The video encoder may compress the video stream, may consider the video type (resolution), target bit rate (e.g., 20 Mbps), target frame rate (e.g., 24 frames per second), GOP length of frames (e.g., 1 second or 60 frames), etc., depending on the quality that applications need. Some embodiments of the disclosure may not recommend or control the quality of video. Some embodiments of the disclosure may assume that the encoder uses a fixed GOP length, but embodiments of the disclosure may include variable GOP length as well.

The object estimator may determine the number of GOPs (or target object size) to store as a separate clip, considering video characteristics such as video type, frame rate, bit rate, and GOP length, and CSD characteristics such as block/object size for best throughput. The encoder may compress the input video as usual and may generate compressed output stream. The splitter may walk the video stream using random access points and may create separate video clips, based on the target number of GOPs. If the splitter is integrated with the encoder, this walking may not be required. The encoder may generate a new clip every target number of GOPs. If variable length GOPs are used, the splitter may create a clip based on target object size as well as the number of GOPs. The actual clip size can be different for each clip.

Once a clip is identified, the splitter may assign a sequence number to the video clip in order and may name each clip using the sequence number. For example, the first clip's name may be the original video name plus 1. The splitter may register the information of clip name and device name to the video directory. The splitter may create a complete video clip including all encoding file format information. Or the splitter may create the first clip that includes the encoding file format information and the others that include only GOP-level metadata information.

The distributor may store a whole clip that the splitter generates to a CSD. That is, a clip may be stored in one CSD rather than split across multiple CSDs. If there are multiple CSDs in the system, the distributor may distribute the clips across multiple CSDs per its distribution policy (e.g., round-robin).

In some embodiments of the disclosure, the decoding may take place in CSDs running in parallel. Since each clip may be a complete video file or contain a set of GOPs, each clip may be processed independently.

For a given video name, the host may retrieve the clip name and device mapping information from the video directory. The host may locate a first clip using the mapping information. The host may read the first clip header information and may share the information with all CSDs. If a complete clip format is used, this step may not be required. The host may retrieve the logical block addresses (LBAs) that a clip uses from the file system and may send them to a CSD in the case of block device. For an object device, the host may retrieve the object IDs or keys and may send them to a CSD. Each CSD may then independently decode each clip. Each CSD may send the decoded video clip associated with the clip name to the merger. The merger may combine the uncompressed video clips based on their names (object IDs or keys) and restore the original video stream.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage system, comprising:
 a first storage device;
 a second storage device;
 a receiver to receive an encoded stream;
 a splitter to identify a first chunk of data in the encoded stream and a second chunk of data in the encoded stream; and
 a distributor to store the first chunk of data on the first storage device and the second chunk of data on the second storage device.

Statement 2. An embodiment of the disclosure includes the storage system according to statement 1, wherein:
 the encoded stream includes an encoded video stream;
 the first chunk of data includes a first chunk of video data; and
 the second chunk of data includes a second chunk of video data.

Statement 3. An embodiment of the disclosure includes the storage system according to statement 1, wherein the receiver is configured to receive the encoded stream from at least one of a processor and a camera.

Statement 4. An embodiment of the disclosure includes the storage system according to statement 1, wherein:
 the first chunk of data includes a first group of pictures; and
 the second chunk of data includes a second group of pictures.

Statement 5. An embodiment of the disclosure includes the storage system according to statement 4, wherein:

the first chunk of data further includes a third group of pictures; and the second chunk of data further includes a fourth group of pictures.

Statement 6. An embodiment of the disclosure includes the storage system according to statement 4, wherein:

the first group of pictures includes a first number of frames;

the second group of pictures includes a second number of frames; and the first number of frames differs from the second number of frames.

Statement 7. An embodiment of the disclosure includes the storage system according to statement 1, wherein:

the first storage device is one of a first block storage device or a first object storage device; and the second storage device is one of a second block storage device or a second object storage device.

Statement 8. An embodiment of the disclosure includes the storage system according to statement 1, wherein:

the first storage device is one of a first hard disk drive or a first Solid State Drive (SSD); and the second storage device is one of a second hard disk drive or a second SSD.

Statement 9. An embodiment of the disclosure includes the storage system according to statement 1, wherein:

the first storage device includes a first computational storage unit; and the second storage device includes a second computational storage unit.

Statement 10. An embodiment of the disclosure includes the storage system according to statement 9, wherein:

the first computational storage unit includes a first accelerator; and the second computational storage unit includes a second accelerator.

Statement 11. An embodiment of the disclosure includes the storage system according to statement 1, wherein the splitter is configured to divide the encoded stream into the first chunk of data and the second chunk of data.

Statement 12. An embodiment of the disclosure includes the storage system according to statement 11, wherein the splitter is configured to divide the encoded stream into a first clip and a second clip, and to divide the first clip into the first chunk of data and the second chunk of data.

Statement 13. An embodiment of the disclosure includes the storage system according to statement 1, wherein the splitter is configured to identify the first chunk of data in the encoded stream and the second chunk of data in the encoded stream based at least in part on a chunk size.

Statement 14. An embodiment of the disclosure includes the storage system according to statement 13, wherein the storage system further includes an object estimator to calculate the chunk size.

Statement 15. An embodiment of the disclosure includes the storage system according to statement 14, wherein:

the object estimator includes a query engine to query the first storage device for a first set of properties and to query the second storage device for a second set of properties; and the object estimator includes a calculator to determine the chunk size based at least in part on the first set of properties or the second set of properties.

Statement 16. An embodiment of the disclosure includes the storage system according to statement 15, wherein the calculator is configured to determine the chunk size based at least in part on the first set of properties, the second set of properties, or a third set of properties, the third set of properties including at least one of a resolution, a bit rate, a frame rate, or a number of frames in a group of pictures.

Statement 17. An embodiment of the disclosure includes the storage system according to statement 16, wherein the query engine is configured to query an encoder for the third set of properties.

Statement 18. An embodiment of the disclosure includes the storage system according to statement 15, wherein:

the first set of properties includes at least one of a first bandwidth of the first storage device, a first latency of the first storage device, or a first block size of the first storage device; and the second set of properties includes at least one of a second bandwidth of the second storage device, a second latency of the second storage device, or a second block size of the second storage device.

Statement 19. An embodiment of the disclosure includes the storage system according to statement 1, wherein the distributor is configured to store the first chunk of data on the first storage device and the second chunk of data on the second storage device based at least in part on a chunk distribution strategy.

Statement 20. An embodiment of the disclosure includes the storage system according to statement 19, wherein the chunk distribution strategy includes a chunk round robin distribution strategy.

Statement 21. An embodiment of the disclosure includes the storage system according to statement 1, further comprising a storage for a directory to map the first chunk of data to the first storage device.

Statement 22. An embodiment of the disclosure includes the storage system according to statement 21, wherein the directory is configured to map a clip to the first chunk of data.

Statement 23. An embodiment of the disclosure includes the storage system according to statement 21, wherein the directory is configured to map the second chunk of data to the second storage device.

Statement 24. An embodiment of the disclosure includes the storage system according to statement 23, wherein the directory is further configured to map a clip to the first chunk of data and the second chunk of data.

Statement 25. An embodiment of the disclosure includes the storage system according to statement 23, wherein the directory is configured to store an order for the first chunk of data and the second chunk of data.

Statement 26. An embodiment of the disclosure includes the storage system according to statement 1, wherein the first storage device stores a third chunk of data in the encoded stream.

Statement 27. An embodiment of the disclosure includes the storage system according to statement 1, wherein:

the receiver is configured to receive a request from a processor to stream the first chunk of data and the second chunk of data;

the first storage device includes a first computational storage unit including a first accelerator configured to decode the first chunk of data to produce a first decoded data based at least in part on the request to stream the first chunk of data and the second chunk of data;

the second storage device includes a second computational storage unit including a second accelerator configured to decode the second chunk of data to produce a second decoded data based at least in part on the request to stream the first chunk of data and the second chunk of data; and the storage system further comprises a streamer to stream the first decoded data and the second decoded data.

Statement 28. An embodiment of the disclosure includes the storage system according to statement 27, wherein:
the storage system further comprises a merger to merge the first decoded data and the second decoded data to produce a merged decoded data; and
the streamer is configured to stream the merged decoded data.

Statement 29. An embodiment of the disclosure includes the storage system according to statement 28, further comprising a storage for a directory to store an order for the first chunk of data and the second chunk of data.

Statement 30. An embodiment of the disclosure includes the storage system according to statement 29, wherein the merger is configured to merge the first decoded data and the second decoded data to produce the merged decoded data based at least in part on the order for the first chunk of data and the second chunk of data.

Statement 31. An embodiment of the disclosure includes the storage system according to statement 28, wherein:
the receiver is configured to receive a request from a processor to stream the first chunk of data, the second chunk of data, and the third chunk of data;
the first computational storage unit stores a third chunk of data;
the first accelerator is configured to decode the first chunk of data to produce a first decoded data and to decode the third chunk of data to produce a third decoded data based at least in part on the request to stream the first chunk of data, the second chunk of data, and the third chunk of data; and
the merger is configured to merge the first decoded data, the second decoded data, and the third decoded data to produce the merged decoded data.

Statement 32. An embodiment of the disclosure includes the storage system according to statement 27, wherein:
the storage system further comprises a storage for a directory to map the first chunk of data to the first computational storage unit and to map the second chunk of data to the second computational storage unit;
the first accelerator is configured to decode the first chunk of data based at least in part on the directory mapping the first chunk of data to the first computational storage unit; and
the second accelerator is configured to decode the second chunk of data based at least in part on the directory mapping the second chunk of data to the second computational storage unit.

Statement 33. An embodiment of the disclosure includes the storage system according to statement 32, wherein:
the receiver is configured to receive a request from the processor to stream a clip;
the first accelerator is configured to decode the first chunk of data based at least in part on the directory mapping the clip to the first chunk and mapping the first chunk of data to the first computational storage unit; and
the second accelerator is configured to decode the second chunk of data based at least in part on the directory mapping the clip to the second chunk and mapping the second chunk of data to the second computational storage unit.

Statement 34. An embodiment of the disclosure includes a method, comprising:
receiving an encoded stream at a storage system;
identifying a first chunk of data in the encoded stream;
identifying a second chunk of data in the encoded stream;
storing the first chunk of data on a first storage device; and
storing the second chunk of data on a second storage device.

Statement 35. An embodiment of the disclosure includes the method according to statement 34, wherein:
the encoded stream includes an encoded video stream;
the first chunk of data includes a first chunk of video data; and
the second chunk of data includes a second chunk of video data.

Statement 36. An embodiment of the disclosure includes the method according to statement 34, wherein receiving the encoded stream at the storage system includes receiving the encoded stream at the storage system from at least one of a processor and a camera.

Statement 37. An embodiment of the disclosure includes the method according to statement 34, further comprising:
dividing the encoded stream into the first chunk of data and the second chunk of data.

Statement 38. An embodiment of the disclosure includes the method according to statement 37, wherein dividing the encoded stream into the first chunk of data and the second chunk of data includes:
identifying a clip in the encoded stream; and
dividing the clip into the first chunk of data and the second chunk of data.

Statement 39. An embodiment of the disclosure includes the method according to statement 38, wherein dividing the encoded stream into the first chunk of data and the second chunk of data further includes:
identifying a second clip in the encoded stream; and
dividing the encoded stream into the clip and the second clip.

Statement 40. An embodiment of the disclosure includes the method according to statement 34, wherein:
the first chunk of data includes a first group of pictures; and
the second chunk of data includes a second group of pictures.

Statement 41. An embodiment of the disclosure includes the method according to statement 40, wherein:
the first chunk of data further includes a third group of pictures; and
the second chunk of data further includes a fourth group of pictures.

Statement 42. An embodiment of the disclosure includes the method according to statement 40, wherein:
the first group of pictures includes a first number of frames;
the second group of pictures includes a second number of frames; and
the first number of frames differs from the second number of frames.

Statement 43. An embodiment of the disclosure includes the method according to statement 34, wherein the storage system includes the first storage device and the second storage device.

Statement 44. An embodiment of the disclosure includes the method according to statement 34, wherein:
the first storage device is one of a first block storage device or a first object storage device; and
the second storage device is one of a second block storage device or a second object storage device.

Statement 45. An embodiment of the disclosure includes the method according to statement 34, wherein:
the first storage device is one of a first hard disk drive or a first Solid State Drive (SSD); and the second storage device is one of a second hard disk drive or a second SSD.

Statement 46. An embodiment of the disclosure includes the method according to statement 34, wherein:
the first storage device includes a first computational storage unit; and
the second storage device includes a second computational storage unit.

Statement 47. An embodiment of the disclosure includes the method according to statement 46, wherein:
the first computational storage unit includes a first accelerator; and
the second computational storage unit includes a second accelerator.

Statement 48. An embodiment of the disclosure includes the method according to statement 34, wherein:
storing the first chunk of data on the first storage device includes storing the first chunk of data on the first storage device based on a chunk distribution strategy; and
storing the second chunk of data on the second storage device includes storing the second chunk of data on the second storage device based on the chunk distribution strategy.

Statement 49. An embodiment of the disclosure includes the method according to statement 48, wherein the chunk distribution strategy includes a chunk round robin distribution strategy.

Statement 50. An embodiment of the disclosure includes the method according to statement 34, wherein:
identifying the first chunk of data in the encoded stream includes identifying the first chunk of data in the encoded stream based on a chunk size; and
identifying the second chunk of data in the encoded stream includes identifying the second chunk of data in the encoded stream based on the chunk size.

Statement 51. An embodiment of the disclosure includes the method according to statement 50, further comprising:
querying the first storage device for a first set of properties;
querying the second storage device for a second set of properties; and
determining the chunk size based at least in part on the first set of properties or the second set of properties.

Statement 52. An embodiment of the disclosure includes the method according to statement 51, wherein:
the first set of properties includes at least one of a first bandwidth of the first storage device, a first latency of the first storage device, or a first block size of the first storage device; and
the second set of properties includes at least one of a second bandwidth of the second storage device, a second latency of the second storage device, or a second block size of the second storage device.

Statement 53. An embodiment of the disclosure includes the method according to statement 51, wherein determining the chunk size based at least in part on the first set of properties or the second set of properties includes determining the chunk size based at least in part on the first set of properties, the second set of properties, or a third set of properties, the third set of properties including at least one of a resolution, a bit rate, a frame rate, or a number of frames in a group of pictures.

Statement 54. An embodiment of the disclosure includes the method according to statement 53, further comprising querying an encoder for the third set of properties.

Statement 55. An embodiment of the disclosure includes the method according to statement 34, further comprising mapping the first chunk of data to the first storage device in a directory.

Statement 56. An embodiment of the disclosure includes the method according to statement 55, wherein mapping the first chunk of data to the first storage device in the directory includes mapping a clip of data to the first chunk of data in the directory.

Statement 57. An embodiment of the disclosure includes the method according to statement 55, further comprising mapping the second chunk of data to the second storage device in the directory.

Statement 58. An embodiment of the disclosure includes the method according to statement 57, wherein mapping the second chunk of data to the second storage device in the directory includes mapping the clip of data to the first chunk of data and the second chunk of data in the directory.

Statement 59. An embodiment of the disclosure includes the method according to statement 57, further comprising storing an order for the first chunk of data and the second chunk of data in the directory.

Statement 60. An embodiment of the disclosure includes the method according to statement 34, further comprising:
identifying a third chunk of data in the encoded stream;
storing the third chunk of data on a first storage device.

Statement 61. An embodiment of the disclosure includes a method, comprising:
receiving at a storage system a request to stream a clip of data;
identifying a first chunk of data in the clip of data stored on a first computational storage unit;
identifying a second chunk of data in the clip of data stored on a second computational storage unit;
decoding the first chunk of data using the first computational storage unit to produce a first decoded data;
decoding the second chunk of data using the second computational storage unit to produce a second decoded data; and
streaming the first decoded data and the second decoded data.

Statement 62. An embodiment of the disclosure includes the method according to statement 61, wherein:
the encoded stream includes an encoded video stream;
the first chunk of data includes a first chunk of video data; and
the second chunk of data includes a second chunk of video data.

Statement 63. An embodiment of the disclosure includes the method according to statement 61, wherein:
the first chunk of data includes a first group of pictures; and
the second chunk of data includes a second group of pictures.

Statement 64. An embodiment of the disclosure includes the method according to statement 63, wherein:
the first chunk of data further includes a third group of pictures; and
the second chunk of data further includes a fourth group of pictures.

Statement 65. An embodiment of the disclosure includes the method according to statement 63, wherein:
the first group of pictures includes a first number of frames;
the second group of pictures includes a second number of frames; and the first number of frames differs from the second number of frames.

Statement 66. An embodiment of the disclosure includes the method according to statement 61, wherein the storage system includes the first computational storage unit and the second computational storage unit.

Statement 67. An embodiment of the disclosure includes the method according to statement 61, wherein:
the first computational storage unit is one of a first block computational storage unit or a first object computational storage unit; and
the second computational storage unit is one of a second block computational storage unit or a second object computational storage unit.

Statement 68. An embodiment of the disclosure includes the method according to statement 61, wherein:
the first computational storage unit is one of a first hard disk drive or a first Solid State Drive (SSD); and
the second computational storage unit is one of a second hard disk drive or a second SSD.

Statement 69. An embodiment of the disclosure includes the method according to statement 61, wherein identifying the first chunk of data in the clip of data stored on the first computational storage unit includes mapping the clip of data to the first computational storage unit.

Statement 70. An embodiment of the disclosure includes the method according to statement 69, wherein mapping the clip of data to the first computational storage unit includes:
mapping the clip of data to the first chunk of data; and
mapping the first chunk of data to the first computational storage unit.

Statement 71. An embodiment of the disclosure includes the method according to statement 69, wherein mapping the clip of data to the first computational storage unit includes mapping the clip of data to the first computational storage unit based at least in part on a directory.

Statement 72. An embodiment of the disclosure includes the method according to statement 71, wherein identifying the second chunk of data in the clip of data stored on the second computational storage unit includes mapping the clip of data to the second computational storage unit based at least in part on the directory.

Statement 73. An embodiment of the disclosure includes the method according to statement 61, wherein:
decoding the first chunk of data using the first computational storage unit to produce the first decoded data includes decoding the first chunk of data using a first accelerator of the first computational storage unit to produce the first decoded data; and
decoding the second chunk of data using the second computational storage unit to produce the second decoded data includes decoding the second chunk of data using a second accelerator of the second computational storage unit to produce the second decoded data.

Statement 74. An embodiment of the disclosure includes the method according to statement 61, wherein streaming the first decoded data and the second decoded data includes:
merging the first decoded data and the second decoded data to produce a merged data; and
streaming the merged data.

Statement 75. An embodiment of the disclosure includes the method according to statement 74, wherein merging the first decoded data and the second decoded data to produce the merged data includes merging the first decoded data and the second decoded data to produce the merged data based at least in part on a directory specifying an order for the first decoded data and the second decoded data.

Statement 76. An embodiment of the disclosure includes the method according to statement 74, wherein:
the method further comprises:
identifying a third chunk of data in the clip of data stored on the first computational storage unit; and
decoding the third chunk of data using the first computational storage unit to produce a third decoded data; and
merging the first decoded data and the second decoded data to produce the merged data includes merging the first decoded data, the second decoded data, and the third decoded data to produce the merged data; and
streaming the first decoded data and the second decoded data includes streaming the first decoded data, the second decoded data, and the third decoded data.

Statement 77. An embodiment of the disclosure includes the method according to statement 76, wherein merging the first decoded data, the second decoded data, and the third decoded data to produce the merged data includes merging the first decoded data, the second decoded data, and the third decoded data to produce the merged data based at least in part on a directory specifying an order for the first decoded data, the second decoded data, and the third decoded data.

Statement 78. An embodiment of the disclosure includes an article, comprising a non-transitory storage medium, the non-transitory storage medium having stored thereon instructions that, when executed by a machine, result in:
receiving an encoded stream at a storage system;
identifying a first chunk of data in the encoded stream;
identifying a second chunk of data in the encoded stream;
storing the first chunk of data on a first storage device; and
storing the second chunk of data on a second storage device.

Statement 79. An embodiment of the disclosure includes the article according to statement 78, wherein:
the encoded stream includes an encoded video stream;
the first chunk of data includes a first chunk of video data; and
the second chunk of data includes a second chunk of video data.

Statement 80. An embodiment of the disclosure includes the article according to statement 78, wherein receiving the encoded stream at the storage system includes receiving the encoded stream at the storage system from at least one of a processor and a camera.

Statement 81. An embodiment of the disclosure includes the article according to statement 78, wherein the non-transitory storage medium has stored thereon further instructions that, when executed by the machine, result in:
dividing the encoded stream into the first chunk of data and the second chunk of data.

Statement 82. An embodiment of the disclosure includes the article according to statement 81, wherein dividing the encoded stream into the first chunk of data and the second chunk of data includes:
identifying a clip in the encoded stream; and
dividing the clip into the first chunk of data and the second chunk of data.

Statement 83. An embodiment of the disclosure includes the article according to statement 82, wherein dividing the encoded stream into the first chunk of data and the second chunk of data further includes:
identifying a second clip in the encoded stream; and
dividing the encoded stream into the clip and the second clip.

Statement 84. An embodiment of the disclosure includes the article according to statement 78, wherein:
the first chunk of data includes a first group of pictures; and
the second chunk of data includes a second group of pictures.

Statement 85. An embodiment of the disclosure includes the article according to statement 84, wherein:
the first chunk of data further includes a third group of pictures; and
the second chunk of data further includes a fourth group of pictures.

Statement 86. An embodiment of the disclosure includes the article according to statement 84, wherein:
the first group of pictures includes a first number of frames;
the second group of pictures includes a second number of frames; and
the first number of frames differs from the second number of frames.

Statement 87. An embodiment of the disclosure includes the article according to statement 78, wherein the storage system includes the first storage device and the second storage device.

Statement 88. An embodiment of the disclosure includes the article according to statement 78, wherein:
the first storage device is one of a first block storage device or a first object storage device; and
the second storage device is one of a second block storage device or a second object storage device.

Statement 89. An embodiment of the disclosure includes the article according to statement 78, wherein:
the first storage device is one of a first hard disk drive or a first Solid State Drive (SSD); and
the second storage device is one of a second hard disk drive or a second SSD.

Statement 90. An embodiment of the disclosure includes the article according to statement 78, wherein:
the first storage device includes a first computational storage unit; and
the second storage device includes a second computational storage unit.

Statement 91. An embodiment of the disclosure includes the article according to statement 90, wherein:
the first computational storage unit includes a first accelerator; and
the second computational storage unit includes a second accelerator.

Statement 92. An embodiment of the disclosure includes the article according to statement 78, wherein:
storing the first chunk of data on the first storage device includes storing the first chunk of data on the first storage device based on a chunk distribution strategy; and
storing the second chunk of data on the second storage device includes storing the second chunk of data on the second storage device based on the chunk distribution strategy.

Statement 93. An embodiment of the disclosure includes the article according to statement 92, wherein the chunk distribution strategy includes a chunk round robin distribution strategy.

Statement 94. An embodiment of the disclosure includes the article according to statement 78, wherein:
identifying the first chunk of data in the encoded stream includes identifying the first chunk of data in the encoded stream based on a chunk size; and
identifying the second chunk of data in the encoded stream includes identifying the second chunk of data in the encoded stream based on the chunk size.

Statement 95. An embodiment of the disclosure includes the article according to statement 94, wherein the non-transitory storage medium has stored thereon further instructions that, when executed by the machine, result in:
querying the first storage device for a first set of properties;
querying the second storage device for a second set of properties; and
determining the chunk size based at least in part on the first set of properties or the second set of properties.

Statement 96. An embodiment of the disclosure includes the article according to statement 95, wherein:
the first set of properties includes at least one of a first bandwidth of the first storage device, a first latency of the first storage device, or a first block size of the first storage device; and
the second set of properties includes at least one of a second bandwidth of the second storage device, a second latency of the second storage device, or a second block size of the second storage device.

Statement 97. An embodiment of the disclosure includes the article according to statement 95, wherein determining the chunk size based at least in part on the first set of properties or the second set of properties includes determining the chunk size based at least in part on the first set of properties, the second set of properties, or a third set of properties, the third set of properties including at least one of a resolution, a bit rate, a frame rate, or a number of frames in a group of pictures.

Statement 98. An embodiment of the disclosure includes the article according to statement 97, wherein the non-transitory storage medium has stored thereon further instructions that, when executed by the machine, result in querying an encoder for the third set of properties.

Statement 99. An embodiment of the disclosure includes the article according to statement 78, wherein the non-transitory storage medium has stored thereon further instructions that, when executed by the machine, result in mapping the first chunk of data to the first storage device in a directory.

Statement 100. An embodiment of the disclosure includes the article according to statement 99, wherein mapping the first chunk of data to the first storage device in the directory includes mapping a clip of data to the first chunk of data in the directory.

Statement 101. An embodiment of the disclosure includes the article according to statement 99, wherein the non-transitory storage medium has stored thereon further instructions that, when executed by the machine, result in mapping the second chunk of data to the second storage device in the directory.

Statement 102. An embodiment of the disclosure includes the article according to statement 101, wherein mapping the second chunk of data to the second storage device in the directory includes mapping the clip of data to the first chunk of data and the second chunk of data in the directory.

Statement 103. An embodiment of the disclosure includes the article according to statement 101, wherein the non-transitory storage medium has stored thereon further instructions that, when executed by the machine, result in storing an order for the first chunk of data and the second chunk of data in the directory.

Statement 104. An embodiment of the disclosure includes the article according to statement 78, wherein the non-transitory storage medium has stored thereon further instructions that, when executed by the machine, result in:
  identifying a third chunk of data in the encoded stream;
  storing the third chunk of data on a first storage device.

Statement 105. An embodiment of the disclosure includes an article, comprising a non-transitory storage medium, the non-transitory storage medium having stored thereon instructions that, when executed by a machine, result in:
  receiving at a storage system a request to stream a clip of data;
  identifying a first chunk of data in the clip of data stored on a first computational storage unit;
  identifying a second chunk of data in the clip of data stored on a second computational storage unit;
  decoding the first chunk of data using the first computational storage unit to produce a first decoded data;
  decoding the second chunk of data using the second computational storage unit to produce a second decoded data; and
  streaming the first decoded data and the second decoded data.

Statement 106. An embodiment of the disclosure includes the article according to statement 105, wherein:
  the encoded stream includes an encoded video stream;
  the first chunk of data includes a first chunk of video data; and
  the second chunk of data includes a second chunk of video data.

Statement 107. An embodiment of the disclosure includes the article according to statement 105, wherein:
  the first chunk of data includes a first group of pictures; and
  the second chunk of data includes a second group of pictures.

Statement 108. An embodiment of the disclosure includes the article according to statement 107, wherein:
  the first chunk of data further includes a third group of pictures; and
  the second chunk of data further includes a fourth group of pictures.

Statement 109. An embodiment of the disclosure includes the article according to statement 107, wherein:
  the first group of pictures includes a first number of frames;
  the second group of pictures includes a second number of frames; and
  the first number of frames differs from the second number of frames.

Statement 110. An embodiment of the disclosure includes the article according to statement 105, wherein the storage system includes the first computational storage unit and the second computational storage unit.

Statement 111. An embodiment of the disclosure includes the article according to statement 105, wherein:
  the first computational storage unit is one of a first block computational storage unit or a first object computational storage unit; and
  the second computational storage unit is one of a second block computational storage unit or a second object computational storage unit.

Statement 112. An embodiment of the disclosure includes the article according to statement 105, wherein:
  the first computational storage unit is one of a first hard disk drive or a first Solid State Drive (SSD); and
  the second computational storage unit is one of a second hard disk drive or a second SSD.

Statement 113. An embodiment of the disclosure includes the article according to statement 105, wherein identifying the first chunk of data in the clip of data stored on the first computational storage unit includes mapping the clip of data to the first computational storage unit.

Statement 114. An embodiment of the disclosure includes the article according to statement 113, wherein mapping the clip of data to the first computational storage unit includes:
  mapping the clip of data to the first chunk of data; and
  mapping the first chunk of data to the first computational storage unit.

Statement 115. An embodiment of the disclosure includes the article according to statement 113, wherein mapping the clip of data to the first computational storage unit includes mapping the clip of data to the first computational storage unit based at least in part on a directory.

Statement 116. An embodiment of the disclosure includes the article according to statement 115, wherein identifying the second chunk of data in the clip of data stored on the second computational storage unit includes mapping the clip of data to the second computational storage unit based at least in part on the directory.

Statement 117. An embodiment of the disclosure includes the article according to statement 105, wherein:
  decoding the first chunk of data using the first computational storage unit to produce the first decoded data includes decoding the first chunk of data using a first accelerator of the first computational storage unit to produce the first decoded data; and
  decoding the second chunk of data using the second computational storage unit to produce the second decoded data includes decoding the second chunk of data using a second accelerator of the second computational storage unit to produce the second decoded data.

Statement 118. An embodiment of the disclosure includes the article according to statement 105, wherein streaming the first decoded data and the second decoded data includes:
  merging the first decoded data and the second decoded data to produce a merged data; and
  streaming the merged data.

Statement 119. An embodiment of the disclosure includes the article according to statement 118, wherein merging the first decoded data and the second decoded data to produce the merged data includes merging the first decoded data and the second decoded data to produce the merged data based at least in part on a directory specifying an order for the first decoded data and the second decoded data.

Statement 120. An embodiment of the disclosure includes the article according to statement 118, wherein:
  the non-transitory storage medium has stored thereon further instructions that, when executed by the machine, result in:
    identifying a third chunk of data in the clip of data stored on the first computational storage unit; and
    decoding the third chunk of data using the first computational storage unit to produce a third decoded data; and
  merging the first decoded data and the second decoded data to produce the merged data includes merging the first decoded data, the second decoded data, and the third decoded data to produce the merged data; and
  streaming the first decoded data and the second decoded data includes streaming the first decoded data, the second decoded data, and the third decoded data.

Statement 121. An embodiment of the disclosure includes the article according to statement 120, wherein merging the first decoded data, the second decoded data, and the third decoded data to produce the merged data includes merging the first decoded data, the second decoded data, and the third decoded data to produce the merged data based at least in part on a directory specifying an order for the first decoded data, the second decoded data, and the third decoded data.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage system, comprising:
 a first storage device;
 a second storage device;
 a receiver to receive an encoded stream;
 a splitter to identify a first chunk of data in the encoded stream and a second chunk of data in the encoded stream; and
 a distributor to store the first chunk of data on the first storage device and the second chunk of data on the second storage device,
 wherein the first chunk of data is decoded independently of the second chunk of data and the second chunk of data is decoded independently of the first chunk of data.

2. The storage system according to claim 1, wherein the splitter is configured to identify the first chunk of data in the encoded stream and the second chunk of data in the encoded stream based at least in part on a chunk size.

3. The storage system according to claim 2, wherein the storage system further includes an object estimator to calculate the chunk size.

4. The storage system according to claim 3, wherein:
 the object estimator includes a query engine to query the first storage device for a first set of properties and to query the second storage device for a second set of properties; and
 the object estimator includes a calculator to determine the chunk size based at least in part on the first set of properties or the second set of properties.

5. The storage system according to claim 4, wherein the calculator is configured to determine the chunk size based at least in part on the first set of properties, the second set of properties, or a third set of properties, the third set of properties including at least one of a fixed resolution, a constant bit rate, a frame rate, or a number of frames in a group of pictures.

6. The storage system according to claim 5, wherein the query engine is configured to query an encoder for the third set of properties.

7. The storage system according to claim 1, wherein the distributor is configured to store the first chunk of data on the first storage device and the second chunk of data on the second storage device based at least in part on a chunk distribution strategy.

8. The storage system according to claim 1, further comprising a storage for a directory to map the first chunk of data to the first storage device.

9. The storage system according to claim 1, wherein:
 the receiver is configured to receive a request from a processor to stream the first chunk of data and the second chunk of data;
 the first storage device includes a first computational storage unit including a first accelerator configured to decode the first chunk of data to produce a first decoded data based at least in part on the request to stream the first chunk of data and the second chunk of data;
 the second storage device includes a second computational storage unit including a second accelerator configured to decode the second chunk of data to produce a second decoded data based at least in part on the request to stream the first chunk of data and the second chunk of data; and
 the storage system further comprises a streamer to stream the first decoded data and the second decoded data.

10. The storage system according to claim 9, wherein:
 the storage system further comprises a merger to merge the first decoded data and the second decoded data to produce a merged decoded data; and
 the streamer is configured to stream the merged decoded data.

11. A method, comprising:
 receiving an encoded stream at a storage system;
 identifying a first chunk of data in the encoded stream;
 identifying a second chunk of data in the encoded stream;
 storing the first chunk of data on a first storage device; and
 storing the second chunk of data on a second storage device,
 wherein the first chunk of data is decoded independently of the second chunk of data and the second chunk of data is decoded independently of the first chunk of data.

12. The method according to claim 11, wherein:
 storing the first chunk of data on the first storage device includes storing the first chunk of data on the first storage device based on a chunk distribution strategy; and
 storing the second chunk of data on the second storage device includes storing the second chunk of data on the second storage device based on the chunk distribution strategy.

13. The method according to claim 11, further comprising mapping the first chunk of data to the first storage device in a directory.

14. The method according to claim 13, further comprising mapping the second chunk of data to the second storage device in the directory.

15. The method according to claim 14, further comprising storing an order for the first chunk of data and the second chunk of data in the directory.

16. A method, comprising:
 receiving at a storage system a request to stream a clip of data;
 identifying a first chunk of data in the clip of data stored on a first computational storage unit;
 identifying a second chunk of data in the clip of data stored on a second computational storage unit;
 decoding the first chunk of data, independently of the second chunk of data, using the first computational storage unit to produce a first decoded data;
 decoding the second chunk of data, independently of the first chunk of data, using the second computational storage unit to produce a second decoded data; and
 streaming the first decoded data and the second decoded data.

17. The method according to claim 16, wherein identifying the first chunk of data in the clip of data stored on the first computational storage unit includes mapping the clip of data to the first computational storage unit.

18. The method according to claim 16, wherein:
 decoding the first chunk of data using the first computational storage unit to produce the first decoded data includes decoding the first chunk of data using a first accelerator of the first computational storage unit to produce the first decoded data; and decoding the second chunk of data using the second computational storage unit to produce the second decoded data includes decoding the second chunk of data using a second accelerator of the second computational storage unit to produce the second decoded data.

19. The method according to claim 16, wherein streaming the first decoded data and the second decoded data includes:

merging the first decoded data and the second decoded data to produce a merged data; and streaming the merged data.

20. The method according to claim 19, wherein merging the first decoded data and the second decoded data to produce the merged data includes merging the first decoded data and the second decoded data to produce the merged data based at least in part on a directory specifying an order for the first decoded data and the second decoded data.

* * * * *